US006964256B2

(12) United States Patent
Kataoka et al.

(10) Patent No.: US 6,964,256 B2
(45) Date of Patent: Nov. 15, 2005

(54) COMBUSTION CONTROL APPARATUS FOR AN ENGINE

(75) Inventors: Motoshi Kataoka, Hiroshima (JP); Yasuyuki Terazawa, Hiroshima (JP); Hiroshi Hayashibara, Hiroshima (JP); Tomoaki Saito, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/397,833

(22) Filed: Mar. 27, 2003

(65) Prior Publication Data

US 2003/0230276 A1 Dec. 18, 2003

(30) Foreign Application Priority Data

Mar. 28, 2002 (JP) ............................ 2002-092446

(51) Int. Cl.[7] ........................ F02B 17/00; F02M 25/07
(52) U.S. Cl. ................. 123/295; 123/299; 123/568.21
(58) Field of Search ............................... 123/295, 299, 123/305, 443, 568.11, 568.14, 568.18, 568.21; 60/285; 701/103–105, 108

(56) References Cited

U.S. PATENT DOCUMENTS

| | | | | |
|---|---|---|---|---|
| 5,743,243 | A * | 4/1998 | Yanagihara | 123/568.12 |
| 6,041,591 | A * | 3/2000 | Kaneko et al. | 60/274 |
| 6,129,075 | A * | 10/2000 | Murata et al. | 123/568.21 |
| 6,318,348 | B1 * | 11/2001 | Xu | 123/568.14 |
| 6,321,715 | B1 * | 11/2001 | Dong | 123/295 |
| 6,325,041 | B1 * | 12/2001 | Mamiya et al. | 123/299 |
| 6,338,245 | B1 * | 1/2002 | Shimoda et al. | 60/285 |
| 6,386,177 | B2 * | 5/2002 | Urushihara et al. | 123/299 |
| 6,390,057 | B2 * | 5/2002 | Yoshizawa et al. | 123/295 |
| 6,401,688 | B2 * | 6/2002 | Teraji et al. | 123/295 |
| 6,434,929 | B1 * | 8/2002 | Nishimura et al. | 60/278 |
| 6,497,213 | B2 * | 12/2002 | Yoshizawa et al. | 123/299 |
| 6,499,456 | B1 * | 12/2002 | Nogi et al. | 123/295 |

(Continued)

FOREIGN PATENT DOCUMENTS

EP 0 732 485 A2 9/1996

(Continued)

OTHER PUBLICATIONS

European Search Report (Dated Jul. 16, 2003).
"Development of Ignition Timing Control in HCC1 D1 Diesel Engine", Hiromichi Yanagihara et al, pp. 17.

*Primary Examiner*—Hai Huynh
(74) *Attorney, Agent, or Firm*—Nixon Peabody LLP; Donald R. Studebaker

(57) ABSTRACT

To optimize an ignition timing of premixture for improving fuel efficiency regardless of significant change in an EGR ratio or a fluctuation in temperature of recirculated exhaust gas and temperature in a combustion chamber, there is provided a control apparatus for a diesel engine which controls an injector extending into the combustion chamber to execute a main-injection for injecting fuel and increasing the EGR ratio, so as to attain the premixed compressive ignition combustion while the engine is in the premixed combustion region on the low load side. Just before or after a cool flame reaction occurs in the mixture formed by the main-injection, an auxiliary-injection is executed so that the latent heat of vaporization of the fuel decreases the temperature of the mixture to delay the ignition to a timing near TDC. The auxiliary-injection amount is adjusted according to the estimated value of EGR ratio or the change in the crank angular velocity to optimize the ignition timing of the mixture.

16 Claims, 15 Drawing Sheets

U.S. PATENT DOCUMENTS

| | | | | |
|---|---|---|---|---|
| 6,609,493 | B2 * | 8/2003 | Yamaguchi et al. | 123/299 |
| 6,655,133 | B2 * | 12/2003 | Kimura et al. | 60/296 |
| 6,725,829 | B2 * | 4/2004 | Kataoka et al. | 123/299 |
| 6,799,551 | B2 * | 10/2004 | Nakakita et al. | 123/295 |
| 2003/0084660 | A1 * | 5/2003 | Shigahara et al. | 60/284 |
| 2003/0159441 | A1 * | 8/2003 | Kim et al. | 60/608 |
| 2003/0192517 | A1 * | 10/2003 | Gates et al. | 123/568.16 |
| 2003/0217733 | A1 * | 11/2003 | Shiraishi et al. | 123/295 |
| 2004/0154582 | A1 * | 8/2004 | Shimazaki | 123/299 |

FOREIGN PATENT DOCUMENTS

| | | | | | |
|---|---|---|---|---|---|
| EP | 0 886 050 | A2 | | 12/1998 | |
| EP | 1 063 427 | A2 | | 12/2000 | |
| EP | 1 085 176 | A2 | | 3/2001 | |
| EP | 1 134 400 | A2 | | 9/2001 | |
| EP | 1 164 277 | A2 | | 12/2001 | |
| EP | 001348858 | A1 | * | 3/2003 | F02D 41/40 |
| JP | 229850 | | * | 8/1999 | F02D 41/04 |
| JP | 2000-8929 | A | | 1/2000 | |
| JP | 2000-110669 | A | | 4/2000 | |
| JP | 20765 | | * | 1/2001 | F02D 13/02 |
| JP | 2002-155780 | | * | 5/2002 | F02D 41/02 |
| WO | WO 99/42718 | | | 8/1999 | |
| WO | WO 01/86128 | A2 | | 11/2001 | |

* cited by examiner (a)

(b)

(c)

(a)

(b)

(a)

(b)

COMBUSTION CONTROL APPARATUS FOR AN ENGINE

BACKGROUND OF THE INVENTION

1. Field of the Invention

The present invention relates to a combustion control apparatus for an engine, and more particularly to ignition timing control for performing fuel injection by directly injecting fuel into the combustion chamber in a cylinder with an injector, so as to generate a premixed air-fuel mixture which causes self ignition by compression.

2. Description of the Related Art

Generally, a direct-injection diesel engine injects fuel into a combustion chamber at a high temperature and high pressure near the top-dead-center position of a compression stroke in a cylinder so as to cause self ignition of the fuel. At this time, the fuel injected into the combustion chamber progresses while being split into fine droplets (atomized) by collision with highly dense air, so as to form an approximately cone-shaped fuel spray. The fuel droplets vaporize from its surface and involve surrounding air mainly at the leading edge and its periphery of the fuel spray to form a mixture which starts combustion at the timing when the density and temperature of the mixture attains the condition required for ignition, i.e., premixed combustion. Then, the combustion shifts to diffusion combustion involving surrounding fuel vapor and air, with at its core the ignition or combustion which has firstly occurred in the above mentioned manner.

In such combustion of a conventional diesel engine (herein referred to as diesel combustion), the major part of fuel causes the diffusion combustion following the initial premixed combustion. At this time, however, in the fuel spray mixture which is heterogeneous in density, nitrogen oxide (NOx) is produced by the abrupt heat production at the portion where excess the air ratio λ close to 1. Moreover, soot is produced by the shortage of oxygen at the portion where the fuel is unduly rich. In this regard, conventionally, the recirculation of part of the exhaust gas to intake air, i.e., exhaust gas recirculation (EGR) or the boosting of fuel injection pressure are put into practice in order to reduce NOx and soot.

During such EGR, the recirculation of the inactive exhaust gas decreases the combustion temperature to suppress the generation of NOx, but on the other hand, reduces the amount of oxygen in the intake air. Thus, a large amount of EGR results in the promotion of soot production. In addition, the boosted fuel injection pressure promotes atomization of fuel spray and increases fuel penetration to improve the air-utilization ratio, which is capable of suppressing the generation of soot, but is likely to easily generate NOx. That is, because of the trade-off relationship between the reductions in NOx and soot, it is actually difficult to decrease both NOx and soot simultaneously during diesel combustion.

To address this problem, a new combustion concept has recently been proposed, which significantly and concurrently reduces NOx and soot by greatly advancing the fuel injection timing to attain a combustion condition mainly dominated by the premixed combustion. The combustion concept is generally known as a premixed compressive ignition combustion. Japanese publication of Patent Application No. 2000-110669 discloses a diesel engine that recirculates a considerable amount of exhaust gas during EGR and injects fuel at the timing within the compression stroke of a cylinder. The injected fuel sufficiently mixes with air to form the mixture, which self-ignites and combusts at the end of the compression stroke.

When such premixed combustion (the premixed compressive ignition combustion) occurs, the ratio of the exhaust gas returned to the intake air by the EGR (the EGR ratio) is increased by a certain amount from that in the diesel combustion described above. Especially, the exhaust gas of which heat capacity is larger than air is mixed with the intake air, and the density of fuel and air in the premixture is decreased to prolong a ignition delay time for sufficiently mixing fuel and intake air, (air and exhaust gas). In addition, the ignition timing of the premixture is generated in such a manner it is delayed to a near top-dead-center (TDC) position of the compression stroke, so as to achieve a heat generation characteristic with a high heat efficiency. Moreover, when the premixture ignites in the abovementioned manner, the inactive exhaust gas is substantially homogeneously diffused around the fuel and air. This absorbs the combustion heat, thereby greatly suppressing NOx generation.

For recirculating such a large amount of exhaust gas to combustion chambers of the respective cylinders, the conventional diesel engine described above is equipped with an exhaust gas recirculation passage having a large diameter communicating the intake passage with the exhaust passage. The exhaust gas is drawn from the exhaust passage upstream of a compressor of a turbocharger and is recirculated to an intake passage downstream of the compressor of the turbocharger. Furthermore, a regulator valve is provided for adjusting the amount of the exhaust gas flowing through the exhaust gas recirculation passage to achieve a proper ratio of the exhaust gas recirculation in the intake air.

However, in the case that the regulator valve adjusts the amount of the exhaust gas through the exhaust gas recirculation passage as described above, the recirculation amount of the exhaust gas does not immediately change upon the adjusting of the opening degree of the exhaust gas recirculation regulator valve, but changes after a lag time. Thus, for example, in the case of an increase in the flow amount of intake air caused by a rise in engine rotational speed, the recirculation amount changes after a lag time, which causes a problem wherein the EGR ratio is temporarily lowered so as to deviate from the proper range. Moreover, the amount of the exhaust gas remaining in the combustion chamber, so called internal EGR, changes depending on an engine operational condition which causes the EGR ratio to fluctuate.

Furthermore, even with the same EGR ratio, the change in temperature condition of the recirculating exhaust gas causes the ignition delay time to vary. That is, the ignition delay time is shortened with an increase in the recirculating exhaust gas temperature, in contrast, the ignition delay time is prolonged with a decrease in recirculating exhaust gas temperature. In addition, the change in temperatures of the combustion chamber and intake air cause the ignition delay time to vary.

Therefore, in the premixed compressive ignition combustion described above, merely adjusting the opening degree of the regulator valve in the exhaust gas recirculation passage is insufficient to maintain the ignition timing of the premixture constantly near the top-dead-center, which causes the problem that the optimum heat generation characteristic is not always attained.

Here, Japanese Publication of Patent Application Publication No. 2000-008929 discloses a control process of the ignition timing of the premixture. According to the process, a part of fuel corresponding to a required engine torque is injected into the combustion chamber at a time within a period from the intake stroke to the compression stroke, to form a relatively lean premixture. Then, the remaining part of fuel is injected near the top-dead-center position of the compression stroke to immediately cause diffusion combustion, which triggers the combustion of the premixture. However, the premixture is compulsorily forced to ignite by the diffusion combustion of the fuel injected at a later time, which causes problems of a considerable amount of soot generation during the combustion; and the degradation in fuel efficiency by a likely increase in the amount of the unburned mixture.

Reference may be made to a paper entitled "Development of Ignition Timing Control in HCCI DI Diesel Engine" by Yanagihara et al, Proceedings of JSAE No. 51-01, No. 20015025, Pages 17–22, May 2001.

The paper discloses a technology, in which the engine with a relatively low compression ratio injects so small an amount of fuel as not to ignite by itself at an early timing (for example, BTDC 50 degrees CA.) of the compression stroke in the cylinder, so as to generate premixture in the combustion chamber.

Then, while a low temperature oxidation reaction (a cool flame reaction) is continuing during the expansion stroke in which the temperature gradually lowers past the top-dead-center of the compression stroke of the cylinder, fuel is additionally injected to ignite and combust.

However, in the prior art, the additional fuel injection also triggers self-ignition. The difference of this prior art from the former prior art (Japanese Publication of Patent Application Publication No. 2000-008929) is that fuel injection timing on the relatively retarded side in tile expansion stroke (for example, ATDC 10 degree CA or after) of the cylinder is set for preventing the additional fuel injection from causing the diffusion combustion. Thus, the greatly retarded ignition timing causes the cycle efficiency to decrease and the amount of unburned premixture to increase, which significantly degrade the fuel efficiency.

SUMMARY OF THE INVENTION

An object of present invention is to optimize ignition timing of a premixture and to improve fuel efficiency, even when the recirculation ratio of the exhaust gas is greatly changed or when the temperature of the exhaust gas and other factors fluctuate by the change in the engine operation. Therefore, in a direct injection engine which injects fuel into the combustion chamber of the cylinder at a relatively early timing, a large amount of exhaust gas is recirculated so as to delay the ignition of the mixture, and the fuel is mixed well with intake air during the delay time, before the combustion of the mixture.

According to the present invention, just before or after the premixture formed from the fuel injected into the combustion chamber in the cylinder during the main-injection starts the cool flame reaction due to the temperature rise in the combustion chamber during the compression stroke of the cylinder, the auxiliary-injection is executed at a predetermined timing.

The amount of the auxiliary-injection is controlled to adjust the ignition timing.

That is, the present invention solves the problems of the prior art as described above by researching the compressive ignition of the premixed air-fuel mixture. As a result, it has been determined that when the additional fuel injection is executed at the predetermined timing just before or after the occurrence of the cool flame reaction of premixture while the temperature in the combustion chamber gradually rise at a late stage of the compression stroke of the cylinder, the transition from the cool flame reaction to the hot flame reaction, that is the ignition, is delayed by the additional fuel injection.

According to these and other aspects of the present invention, there is provided a combustion control apparatus for an engine including a fuel injector extending into a combustion chamber of a cylinder of the engine, an exhaust gas recirculation regulator device for adjusting the amount of the exhaust gas recirculated to the combustion chamber; a main-injection control device which controls the injector to inject fuel at a timing during the intake stroke or the compression stroke to achieve a combustion in which the ratio of the premixed combustion is larger than that of the diffusion when the engine is in a predetermined operational condition; an exhaust gas recirculation control device which controls the exhaust gas recirculation regulator device so that an EGR value associated with the recirculation amount of the exhaust gas is a first predetermined value or more when the engine is in the predetermined operational condition; and an auxiliary-injection control device which controls the injector to perform auxiliary-injection at a predetermined timing at a late stage of the compression stroke, so as to delay the transition from a cool flame reaction to a hot flame reaction caused in the compression stroke of the cylinder at increasing temperature by the premixture formed of the fuel by the main-injection.

As a result, the main-injection control device controls the injector to inject fuel at a relatively early timing at least in one of the intake stroke and the compression stroke for executing the main-injection. Moreover, the exhaust gas recirculation control device controls the exhaust gas recirculation regulator device so that the recirculation ratio becomes a predetermined value or more (the EGR value is equal to or larger than the first predetermined value). Thus, the fuel injected during the main-injection is widely diffused relatively over the combustion chamber and is sufficiently mixed with both the recirculated exhaust gas and air to form a highly homogenized air-fuel mixture. The mixture self-ignites at the late stage of the compression stroke to attain the combustion in which the ratio of the premixed combustion is relatively large. The combustion is a low temperature combustion similar to that of the conventional example (Japanese Publication of Patent Application Publication No. 2000-110669), which produces a significantly small amount of NOx and soot.

Additionally, the auxiliary-injection control device of the present invention controls the injector to inject fuel for executing auxiliary-injection just before or after the cool flame reaction occurs in the premixture at the raised temperature in the combustion chamber during the compression stroke of the cylinder. The injected fuel absorbs heat from the surrounding premixture during fuel evaporation to lower the temperature, so that the transition from cool flame reaction to hot flame reaction, i.e., the ignition of mixture, is delayed.

At this time, as the auxiliary-injection amount is increased, the temperature of the premixture is lowered to prolong the delay time. Thus, the ignition timing is controlled by the adjustment of the auxiliary-injection amount.

Preferably, the auxiliary-injection control device may control the auxiliary-injection amount so that the ignition of mixture, that is, the transition from the cool flame reaction to the hot flame reaction occurs within the predetermined period near the top-dead-center of the compression stroke of the cylinder.

This is because, as described above, as the auxiliary-injection amount is increased, the temperature of the premixture is lowered to prolong the delay time. Thus, the ignition timing is controlled by the adjustment of the auxiliary-injection amount.

Accordingly, even when the recirculation ratio of the exhaust gas is changed or even when temperature and other factors of the exhaust gas fluctuate due to the change in the engine operational condition, the ignition timing of the premixture can be maintained within a predetermined period near the top-dead-center (TDC) position so as to achieve a heat generation characteristic with high cycle efficiency.

More preferably, the auxiliary-injection amount may be adjusted according to at least the EGR value.

Specifically, an EGR ratio estimating device may be provided for estimating an actual EGR value of the engine, and the auxiliary-injection amount may be adjusted according to at least the value estimated by the EGR ratio estimating device. It is to be noted that the control of the auxiliary-injection amount may be performed based on the temperature of the exhaust gas and the temperature of the cylinder, in addition to the EGR value or its estimated value.

When the auxiliary-injection amount is adjusted in association with the EGR value as described above, the auxiliary-injection amount can be properly adjusted so as to compensate for the influence on the ignition timing by the change in the recirculation ratio of the exhaust gas to the combustion chamber, thereby attaining an optimum heat generation characteristic with high cycle efficiency. Particularly, when the auxiliary-injection amount is adjusted according to the estimated value of the actual EGR value, control accuracy is improved, thereby sufficiently providing the effect described above.

Preferably, the auxiliary-injection control device may increases: the auxiliary-injection amount when the estimated value pf the EGR value is equal to or larger than a second predetermined value, which is smaller than the first predetermined value.

Thus, the increase in the auxiliary-injection amount delays the ignition timing of the premixture to near TDC even when, for example the increase in the recirculation amount of the exhaust gas is delayed to unduly lower the EGR ratio (i.e., the estimated value of the EGR value becomes the second predetermined value or less) while the engine is accelerating.

More preferably, an engine torque detecting device may be provided for detecting a value associated with the engine output torque, and the auxiliary-injection control device may preferably adjust the auxiliary-injection amount according to the value detected by the engine torque detecting device.

Specifically, the auxiliary-injection control device may compulsorily increase or decrease the auxiliary-injection amount in the steady state of the engine, and control the auxiliary-injection amount according to the change in the value detected by the engine torque detecting device as a result of the compulsory increase or decrease.

More specifically, when the value detected by the engine torque detecting device changes toward the higher torque side as a result of the increase in the auxiliary-injection amount, the auxiliary-injection amount may be further increased, and when the detected value changes toward the lower torque side as a result of the increase in the auxiliary-injection amount, the auxiliary-injection amount may be decreased. On the other hand, when the value detected by the engine torque detecting device changes toward the higher torque side as a result of the decrease in the auxiliary-injection amount, the auxiliary-injection amount may be further decreased, and, when the detected value changes toward the lower torque side as a result of the decrease in the auxiliary-injection amount, the auxiliary-injection amount may be increased.

That is, the increase in the auxiliary-injection amount causes the ignition timing of the 10 premixture to retard.

Thus, if the engine torque is increased as a result of the increase in the auxiliary-injection amount, the ignition timing is on the advanced side of the optimum timing. To cope with this, the auxiliary-injection amount is further increased.

In contrast, if the engine torque is lowered as a result of the increase in the auxiliary-injection amount, the ignition timing of the premixture is on the retarded side of the optimum timing. To attend to this, the auxiliary-injection amount is decreased. This causes the ignition of the premixture to occur at the timing which maximizes the engine torque, or achieves the optimum heat generation characteristic.

In the same manner, the auxiliary-injection amount may be increased or decreased according to the change in engine output torque when the auxiliary-injection amount is decreased.

That is, even when the ignition delay time is changed depending on the recirculation ratio and temperature of the exhaust gas and the temperature of the combustion chamber, the adjustment of the auxiliary-injection amount according to the change in engine output torque can cancel the influence of the ratio and temperature, thereby optimizing the ignition timing of the premixture.

Other features, aspect and advantages of the present invention will become apparent from the following description of the invention which refer to the accompanying drawings:

DETAILED DESCRIPTION OF THE PREFERRED EMBODIMENTS

Preferred embodiments of the present invention will be described with reference to the accompanying drawings.

Figure 1:
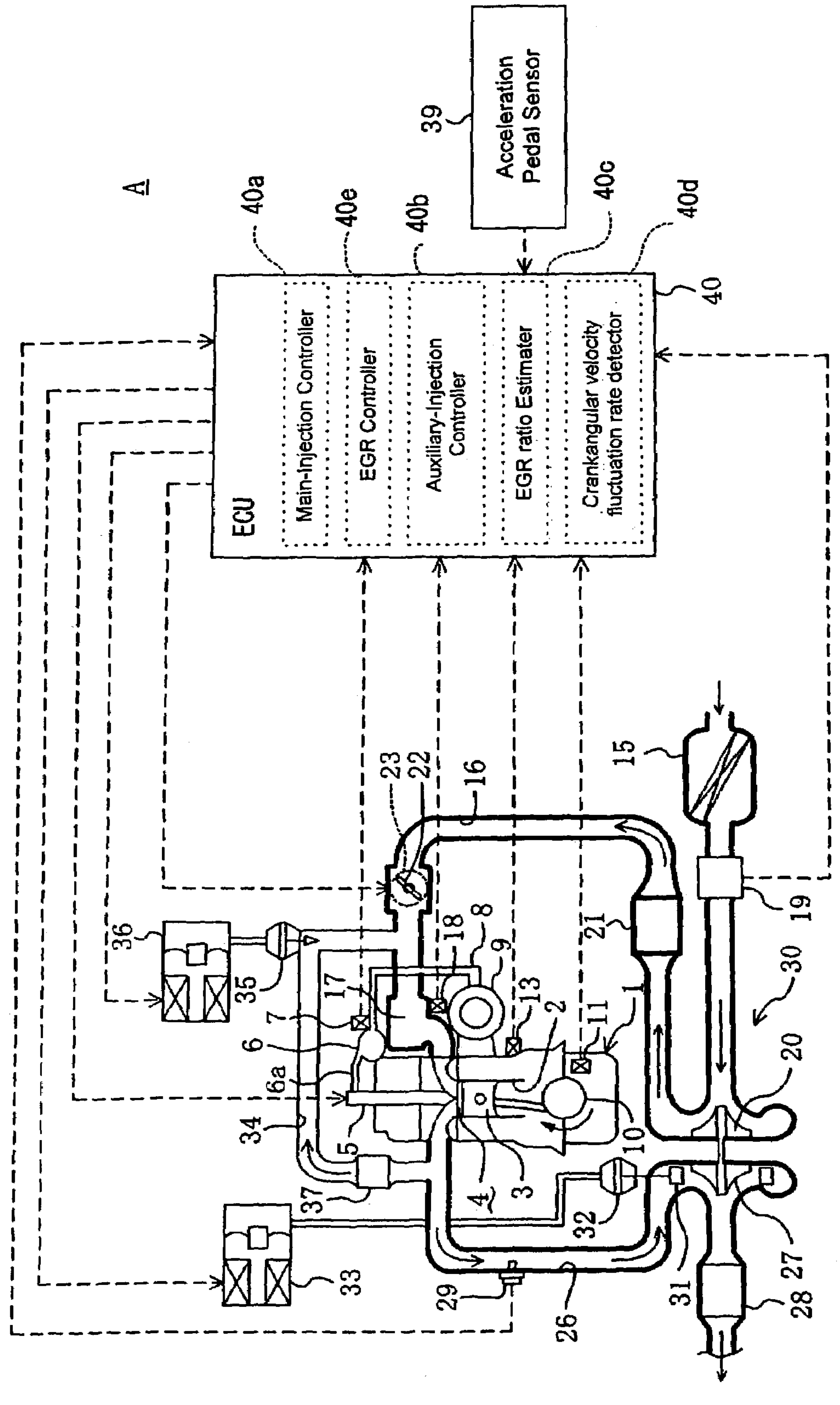
FIG. 1 is a schematic diagram illustrating an overall structure of a combustion control apparatus for an engine in accordance with a preferred embodiment of the present invention.

FIG. 1 illustrates a configuration of a combustion control apparatus A for an engine in accordance with a preferred embodiment of the present invention. Identified by reference numeral 1 is diesel engine mounted in a vehicle. The engine 1 comprises a plurality of cylinders 2 only one of which is illustrated for convenience. A piston 3 is fitted within each cylinder 2, so as to reciprocate in a vertical direction, respectively. The piston 3 defines a combustion chamber 4 within each cylinder 2. An injector 5 (fuel injection valve) is arranged at a roof of the combustion chamber 4. The injector 5 injects fuel at high pressure directly into the combustion chamber 4 from injection bores at the tip of the injector 5. The proximal end of the injector 5 for each cylinder 2 is connected to a common fuel delivery pipe 6 (a common rail) via fuel delivery pipes 6*a* only one of which is illustrated, respectively. The common rail 6, connected to a high-pressure supply pump 9 via a fuel supply pipe 8, accumulates fuel supplied from the high-pressure supply pump 9 at high pressure in order to supply fuel to the injectors 5 at required timings. The common rail 6 is provided with a fuel pressure sensor 7 for detecting the internal pressure thereof, i.e., common rail pressure.

The high-pressure supply pump 9 is connected to a fuel supply system not shown and is operably connected to a crank shaft 10 through a toothed belt or other parts for pressure-feeding the high pressure fuel to the common rail 6. The fuel is partially returned to the fuel supply system via a solenoid valve to adjust the amount of the fuel to be supplied to the common rail 6. The opening of the solenoid valve is controlled by an ECU 40, which will be described further herein, based on the detected value of the fuel-pressure sensor 7, so that the fuel pressure is set to a predetermined value corresponding to the operational condition of the engine 1.

In addition, at the top portion of the engine 1, valve-driving mechanisms, not shown, are disposed for opening and closing intake valves and exhaust valves, respectively. On the other hand, at the bottom portion of the engine 1, a crank angle sensor 11 is disposed for detecting the rotational angle of crank shaft 10, and an engine coolant temperature sensor 13 is disposed for detecting a temperature of the coolant. The crank angle sensor 11, not illustrated in detail, comprises a detectable plate provided at the end of the crank shaft 10 and an electromagnetic pick up facing the periphery of the plate. The pickup generates pulsed signals in response to the approach of teeth formed at regular intervals on the outer peripheral surface of the detectable plate.

One side surface of the engine, on the right-side surface in the drawing, is connected to an intake passage 16 for supplying intake air filtered by an air cleaner 15, (fresh air) to the combustion chamber 4. At the downstream end of the intake passage 16, a surge tank 17 is disposed, from which respective passages branch out to communicate with the combustion chamber 4 in each cylinder 2 via intake ports. The surge tank 17 is provided with an intake air pressure sensor 18 for detecting the 5 pressure of intake air.

In the intake passage 16, from the upstream side to the downstream side, the following components are provided in order: a hot-film type air flow sensor 19 for detecting the amount of intake air introduced from the outside into the engine 1; a compressor 20 driven by a turbine 27, described later herein, for compressing intake air; an intercooler 21 for cooling intake air compressed by the compressor 20; and an intake-air throttle valve or butterfly valve 22. A valve shaft of the throttle valve 22 is rotated by a stepping motor 23 so that the valve can be set to a predetermined position between a fully closed state and a fully open state. In the fully closed state of the valve 22, a clearance is left between the throttle valve 22 and inner wall of the intake passage 16, through which air passes.

The opposite side of the engine 1, (the left-side surface of the FIG. 1) is connected to an exhaust gas passage 26 for exhausting combust gas (exhaust gas) from the combustion chamber 4 into each cylinder 2. The upstream end of the exhaust passage 26 branches out corresponding to the respective cylinders 2, to form exhaust manifolds communicating with the combustion chamber 4 via exhaust ports. In the exhaust gas passage downstream of the exhaust manifold, from the upstream side to the downstream side, the following components are provided in order: a linear $O_2$ sensor 29 for detecting $O_2$ concentration in the exhaust gas; a turbine 27 rotated by an exhaust gas flow; and a catalyst converter 28 capable of purifying harmful components (such as HC, CO, NOx, and soot) in exhaust gas.

A turbocharger 30 comprising the turbine 27 and the compressor 20 in the intake passage 16, is of a variable geometry turbocharger (herein referred to as VGT), and adjusts a cross-sectional area in the exhaust passage communicating with the turbine 27 using adjustable flaps 31 only one of which is shown. Each of the flaps 31 are operably connected to a diaphragm 32 via a link mechanism not shown. The negative pressure acting on the diaphragm 32 is adjusted by a solenoid valve for controlling the negative pressure, so that the rotational positions of the flaps 31 are adjusted.

An upstream end of a exhaust gas recirculation passage 34 (EGR passage), for partially recirculating the exhaust gas to the intake air, is connected to the exhaust passage 26, so as to open to a portion of the passage 26 on the upstream side of the turbine 27 with respect to the exhaust gas flow. The downstream end of the EGR passage 34 is connected to the intake passage 16 between the throttle valve 22 and the surge tank 17, which recirculates the drawn part of the exhaust gas from the exhaust passage 26 to the intake air passage 16. At the midstream portion of the EGR passage 34, an EGR cooler 37 for cooling the exhaust gas flowing through the EGR passage 34 and an exhaust recirculation amount regulator valve 35 (EGR valve) having an adjustable opening are arranged. The EGR valve 35 is of a vaccum sensing type. Similar to the flaps 31 of the VGT 30 described above, a solenoid valve 36 adjusts the negative pressure acting on a diaphragm, which thus linearly controls the cross-sectional area of the EGR passage 34 to achieve a proper flowing amount of the exhaust gas to be recirculated to the intake passage 16. It should be appreciated that the apparatus of the present invention need not include EGR cooler 37.

The injector 5, the high-pressure pump 9, the throttle valve 22, the VGT 30, the EGR valve 35, and other parts operate according to control signals transmitted from an electronic control unit 40 (ECU). ECU 40 receives output signals from the fuel pressure sensor 7, the crank angle sensor 11, the coolant temperature 13, the intake air pressure sensor 18, the air flow sensor 19, the linear $O_2$ sensor 29, and other parts. The ECU 40 further receives an output signal from an acceleration pedal sensor 39 for detecting an accelerator pedal travel, not shown, operated by a driver (accelerator pedal position).

The ECU 40 controls the engine 1 to determine a basic target fuel injection amount according to the accelerator pedal position, adjust the fuel injection amount and injection timing by controlling the operation of the injector, and adjust the fuel pressure, or the injection pressure of fuel by controlling the operation of the high-pressure pump. Moreover, the ECU 40 controls the throttle valve 22 and the EGR valve 35 to adjust the ratio of the returning exhaust gas into the combustion chamber 4, and the flaps 31 of the VGT 30 (the control of the VGT) to improve charging efficiency of intake air.

Figure 2:
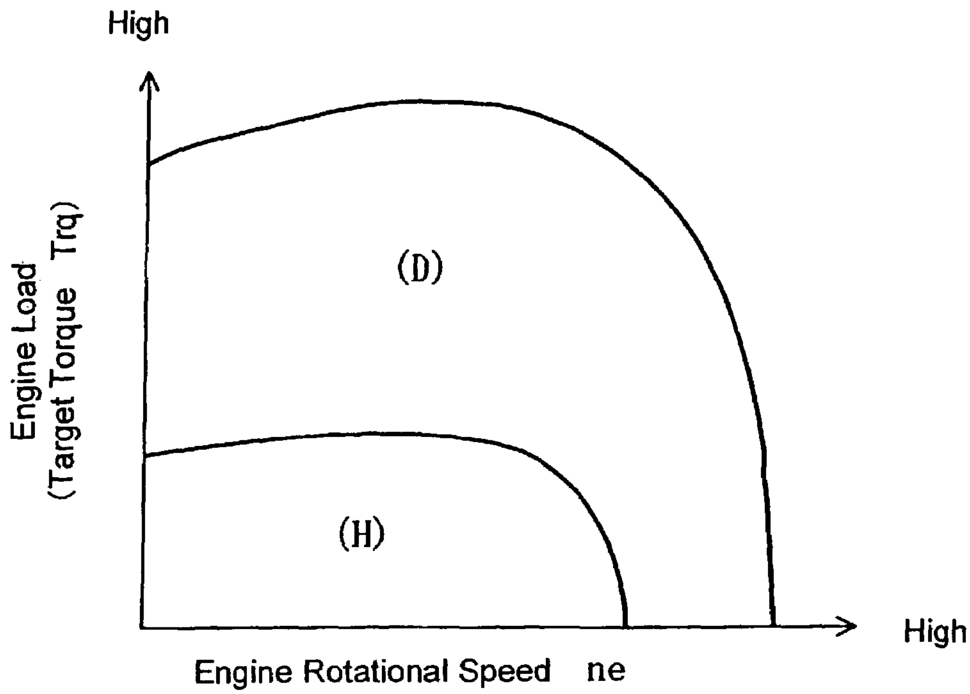
FIG. 2 is a graph showing an example of a map used for switching the engine combustion modes.
Figure 3:
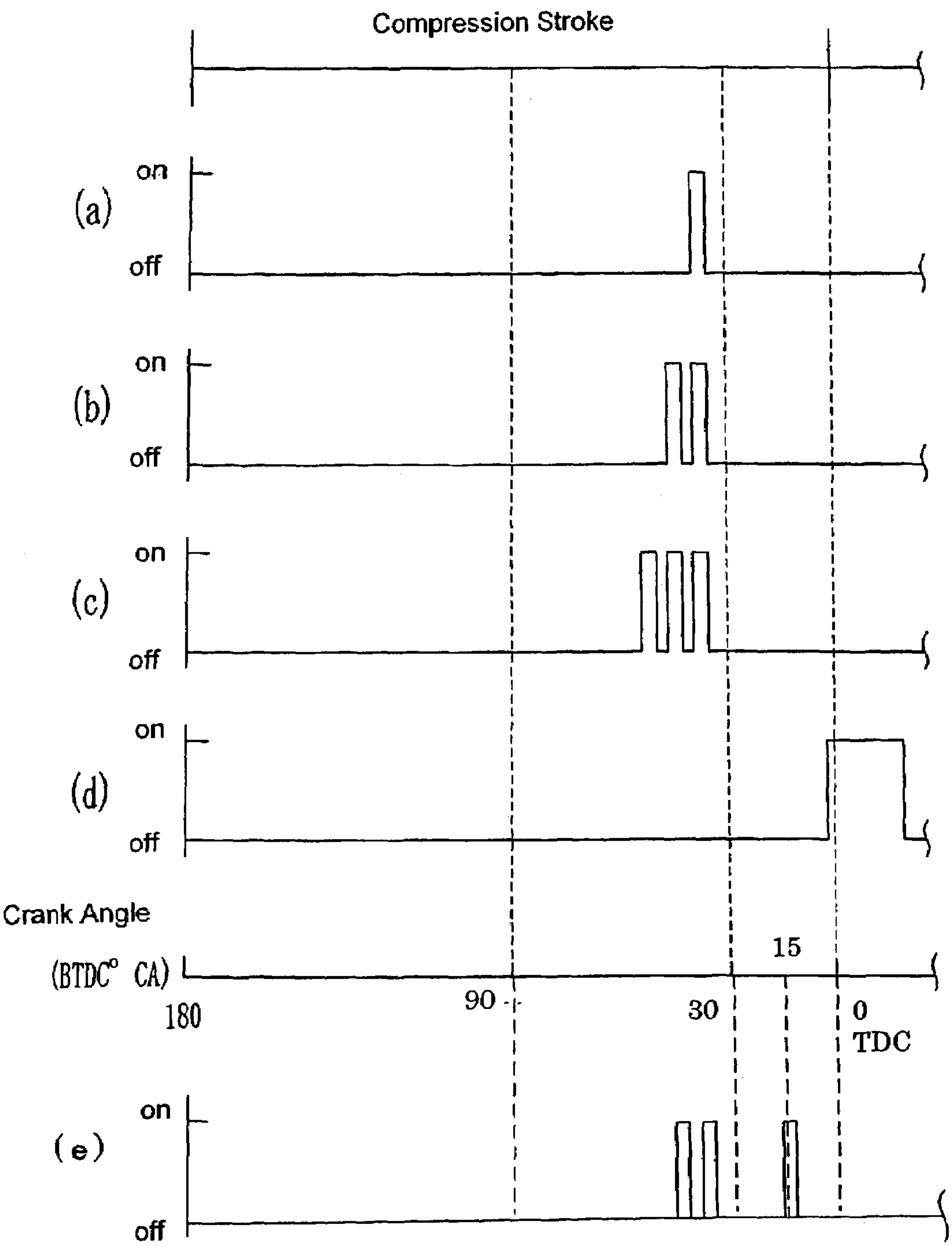
FIG. 3(*a*)–(*e*) are graphs schematically showing the fuel injection operation by the injector.

Particularly, as shown in the control map (or combustion mode map) of FIG. 2, a region of a premixed combustion (H) is defined on the relatively low engine load side in the whole operational region in a warmed-up state of engine (predetermined operational condition). In the region, as schematically shown in FIGS. 3(*a*) to (*c*), the injector 5 injects fuel within a period between the middle-stage and late-stage of the compression stroke to cause a self-ignition of the mixture after the mixture previously becomes as homogeneous as much as possible. Such combustion configuration is commonly referred to as the premixed compressive ignition combustion. Under this combustion configuration, most of the mixture simultaneous ignites after the elapse of an ignition delay time and combusts at once, by properly adjusting the fuel injection timing to broadly diffuse the fuel adequately for attaining mixture well-mixed with air, when the smaller amount of the fuel is to be injected per one cycle of the cylinder. That is, the premixed compressive ignition combustion is defined as the combustion whereby the ratio of premixed combustion is larger than that of diffusion combustion.

In this case, the fuel injection by the injector 5 may be executed in a one-shot manner as shown in FIG. 3(*a*), otherwise, in a divided manner with a plurality of shots as shown in FIGS. 3(*b*) and (*c*). The injection occurring in the divided manner can avoid unduly enhanced fuel penetration of fuel spray when the fuel is injected within a period between the middle stage and the late stage of the compression stroke of the cylinder 2 into the combustion chamber 4, where pressure and density of gas are lower than those near the top-dead-center of the compression stroke. Thus, the number of the fuel injections (the number of divisions) are preferably increased for the larger amount of fuel to be injected.

During the premixed compressive ignition combustion, the EGR valve 35 is opened by a relatively large amount to return a considerable amount of exhaust gas into the intake passage 16. Accordingly, the inactive exhaust gas with a large heat capacity is mixed with fresh air supplied from outside, and the resulting gas is mixed with fuel droplets and fuel vapor, so that the heat capacity of mixture is increased and the density of fuel and oxygen within the mixture relatively becomes relatively low. This enables the ignition and combustion to occur after air, exhaust gas, and fuel are sufficiently mixed during prolonged ignition delay time.

Figure 4:
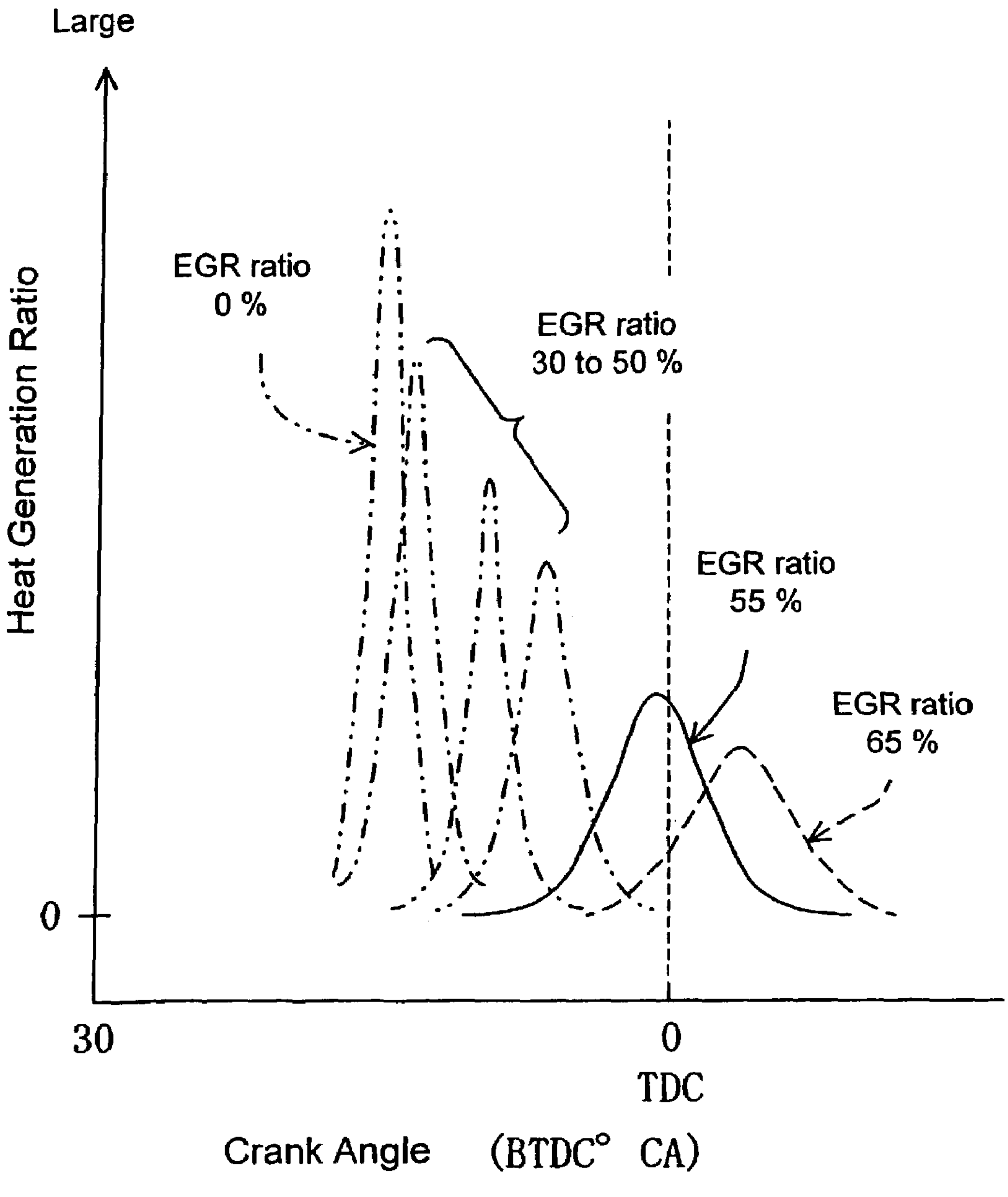
FIG. 4 is a graph illustrating the changes in the heat generation ratio with respect to the crank angle for different EGR ratios.

The graph chart of FIG. 4 is an empirical result showing the change in the heat generation characteristic with respect to the EGR ratio, i.e., the ratio of the exhaust gas recirculation amount to the total amount summing up the fresh air amount and the exhaust gas recirculation amount, when the fuel is injected at a predetermined crank angle (for example, BTDC 30 degrees CA) prior to top-dead-center of the compression stroke (BTDC) to cause the premixed compressive ignition combustion, while the engine 1 is in the low engine load. As indicated by phantom line in FIG. 4, a small EGR ratio causes the mixture to self-ignite on the significantly advanced side of the TDC, which provides unduly early heat generation with low cycle-efficiency. On the other hand, the timing of self-ignition gradually shifts towards the advanced side as the EGR ratio increase, and as indicated by the solid line in FIG. 4, the EGR ratio of 55% maximizes the heat generation at approximately TDC, which provides heat generation with a high cycle efficiency. Moreover, the graph of FIG. 4 reveals that the peak of heat generation is significantly raised with the low EGR ratio so as to cause intense combustion at high combustion velocity. At this time, NOx is actively produced and a significantly loud combustion noise is emitted during the combustion. However, as the EGR ratio increases, the gradient of the rise in heat efficiency gradually becomes gentle and the maximum heat efficiency becomes lower. This can be attributed to the considerable amount of exhaust gas included in the mixture as described above which lowers the density of fuel and oxygen by the amount corresponding to the exhaust gas amount, and the exhaust gas absorbs the combustion heat. Then, the low temperature combustion condition with such gentle heat generation significantly suppresses NOx production.

Figure 5:
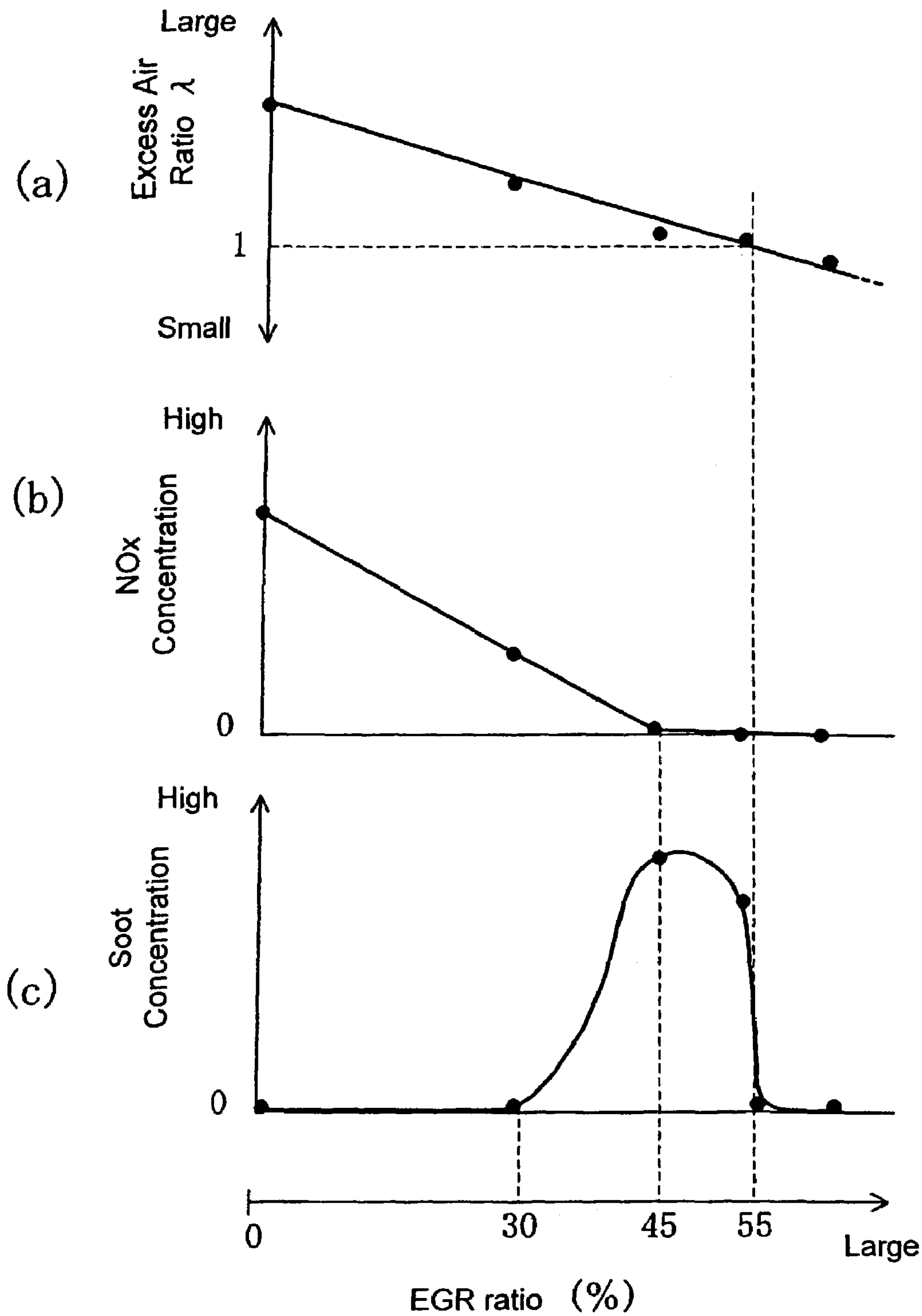
FIG. 5(*a*),(*b*), and (*c*) are graph charts relationally showing the changes in excess air ratio, NOx concentration, and soot concentration with respect to the EGR ratio, respectively.

The graphs of FIG. 5 empirically shows the change in an excess air ratio $\lambda$ in the combustion chamber and concentration of NOx and soot in the exhaust gas with respect to the EGR ratio. FIG. 5(*a*) reveals that, under this empirical condition, the large excess air ratio $\lambda$ of approximately 2.7 is attained when the EGR ratio is 0%, and the increase in the EGR ratio gradually decreases the excess air ratio $\lambda$, until eventually providing $\lambda=1$ when the EGR ratio is approximately 55% to 60%. That is, the increase in recirculation ratio of exhaust gas brings the mean excess air ratio $\lambda$ of the mixture near 1. However, the density of fuel and oxygen is not so high even with the ratio of oxygen to fuel being approximately $\lambda=1$, because a large amount of exhaust gas exists around the fuel and oxygen. Accordingly, as shown in FIG. 5(*b*), the increase in EGR ratio decreases NOx concentration in the exhaust gas at a constant rate, until NOx is hardly generated with the EGR ratio greater than 45%.

As for soot production, FIG. 5(*c*) reveals that soot is hardly generated with the EGR ratio between 0 and approximately 30%. Then, soot concentration abruptly increases when the EGR ratio exceeds approximately 30%, but decreases again when the EGR ratio exceeds approximately 50%, until reaching approximately zero when the EGR ratio exceeds approximately 55%. This is because, when the EGR ratio is low, the combustion configuration, in which the ratio of the diffusion combustion is larger than that of the premixed combustion, occurs similar to conventional diesel combustion, and soot is hardly generated during intense combustion because of the excessive amount of air versus the fuel amount in the intake air. In contrast, when the increase in the EGR ratio decreases the amount of oxygen in the intake air, the diffusion combustion is degraded, so that soot generation abruptly increases. On the other hand, when the EGR ratio exceeds approximately 55%, the combustion occurs after fresh air, exhaust gas, and fuel are sufficiently well mixed as described above, which hardly generates soot.

In short, in this embodiment, when the engine 1 is in the region (H) of the premixed 15 combustion defined on the low engine load side, the fuel injection is executed at a relatively early timing. In addition, the opening of the EGR valve is controlled so that the EGR ratio exceeds a predetermined value, i.e., a first predetermined value of approximately 55% as in the empirical embodiment described above, and preferably within a range between approximately 50% to 60% in general. Thus, the low temperature combustion mainly dominated by the premixed combustion is attained, with little NOx production nor soot production.

On the other hand, as shown in the control map in FIG. 2, in the region (D) on the high rotational speed side and high engine load side, except for the region of the premixed combustion (H), the conventional diesel combustion, in which the ratio of the diffusion combustion is larger than that of the premixed combustion, is performed. Particularly, as shown in FIG. 3(*d*), the injector 5 is controlled to inject fuel mainly at a timing near top-dead-center of the cylinder 2, so that most fuel causes the diffusion combustion following initial premixed combustion. The operational region (D) will be referred to as the diffusion combustion region hereinafter. In this operational region, the injection may be executed at timings other than the timing near top-dead-center of the compression of the cylinder 2).

Figure 6:
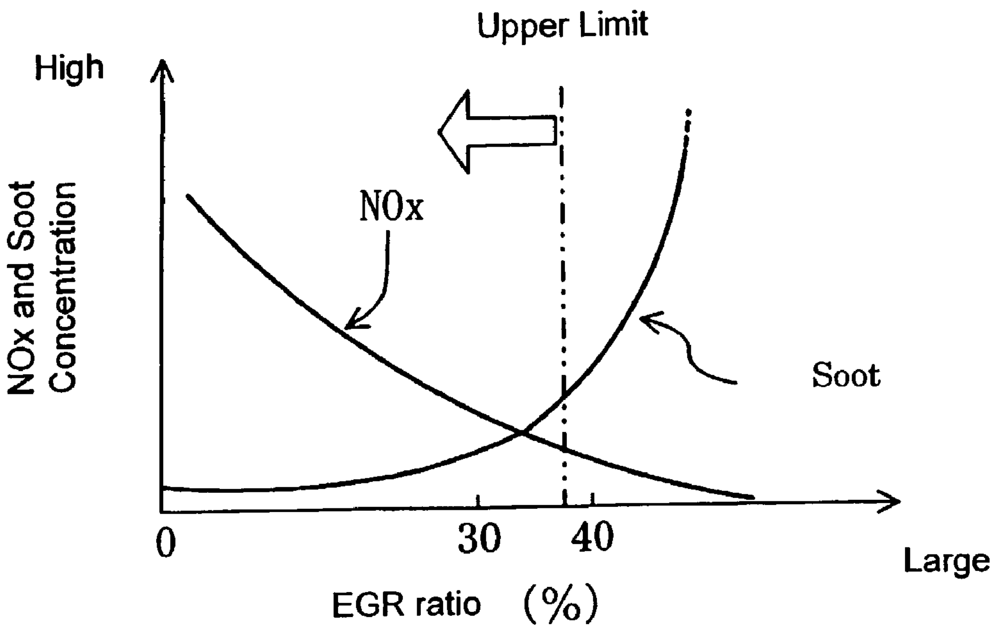
FIG. 6 is a graph showing the changes in NOx concentration and soot concentration with respect to the EGR ratio, during the diesel combustion.

In the diffusion combustion, the opening of the EGR valve 35 is controlled to a smaller degree than that in the premixed combustion region (H), so that the EGR ratio becomes the predetermined value or less. This is because in the conventional diesel combustion mainly dominated by the diffusion combustion, the EGR ratio should be set so as to suppress as much NOx production as possible without the increase in soot production. Particularly, as shown in the graph of FIG. 6, by way of example, the upper limit of the EGR ratio is preferably set within approximately 30% to 40%, in the diffusion combustion region (D). Moreover, because the amount of fresh air supplied to cylinder 2 should be ensured for accommodating the increase in engine load, the EGR ratio is lowered on the higher engine load side. Furthermore, because the charging pressure of intake air is increased by the turbocharger 30 on the higher rotational speed side and the higher engine load side, the exhaust gas recirculation is not substantially performed.

Nevertheless, when the engine 1 performs the premixed compressive ignition combustion with the high EGR ratio as described above, the limitless increase in the recirculation amount of the exhaust gas into the combustion chamber 4 is unfavorable. For example, when the EGR ratio unduly increases, the ignition timing of the premixture is unduly delayed to degrade the cycle efficiency, which increases the amount of unburned fuel and may cause misfire. To this, the ECU 40 generally regulates the opening of the EGR valve 35 in response to the changes in the engine rotational speed and the intake air amount calculated based on the signal from the air-flow sensor 19.

However, in the accelerating condition of the engine 1, the change in the recirculation amount of the exhaust gas lags behind the increase in intake air flow amount, which may cause a problem in that the EGR ratio temporarily decreases too far below the first predetermined value. Especially, in the engine 1 including the turbocharger 30 as in this embodiment, the recirculation amount of the exhaust gas greatly changes depending on the charge in charging pressure, so that the EGR ratio is likely to greatly change. This problematically fluctuates the ignition timing.

In addition, even with the same EGR ratio, the change in temperature condition of the recirculating exhaust gas causes the ignition delay time to vary. Especially, the ignition delay time shortens for the higher temperature recirculated exhaust gas. In contrast, the ignition delay time is prolonged for the lower temperature recirculated exhaust gas. Furthermore, the ignition delay time varies with the changes in temperature in the combustion chamber 4 and the temperature of the intake air. Such change in ignition timing due to the change in temperature, as above, is also a problem to be solved.

That is, when the engine 1 performs the premixed compressive ignition combustion, the mere control of the opening of the EGR valve can not maintain the ignition timing of premixture within the proper range near TDC, and can not always provide the optimum heat generation characteristic.

The present invention determined that when additional fuel injection, herein referred to as auxiliary-injection, is executed at the predetermined timing just before or after the occurrence of the cool flame reaction of the premixture, while the temperature in the combustion chamber 4 gradually rises during the late stage of the compression stroke of the cylinder 2 of the engine 1, as shown in FIG. 3(*e*), the transition from the cool flame reaction to the hot flame reaction, that is, ignition is delayed by the auxiliary-injection, and the delay time changes with respect to the fuel amount of the additional fuel injection. Preferably, the injection start of the auxiliary-injection is set so that the fuel injected by the auxiliary-injection diffuses the combustion chamber 4 by the timing of the occurrence of the cool flame reaction. This enhances the effect of the ignition delay and the variation in the delay time.

The cool flame reaction generally occurs near the timing of 15 degrees CA before top-dead-center in the compression stroke.

Figure 7:
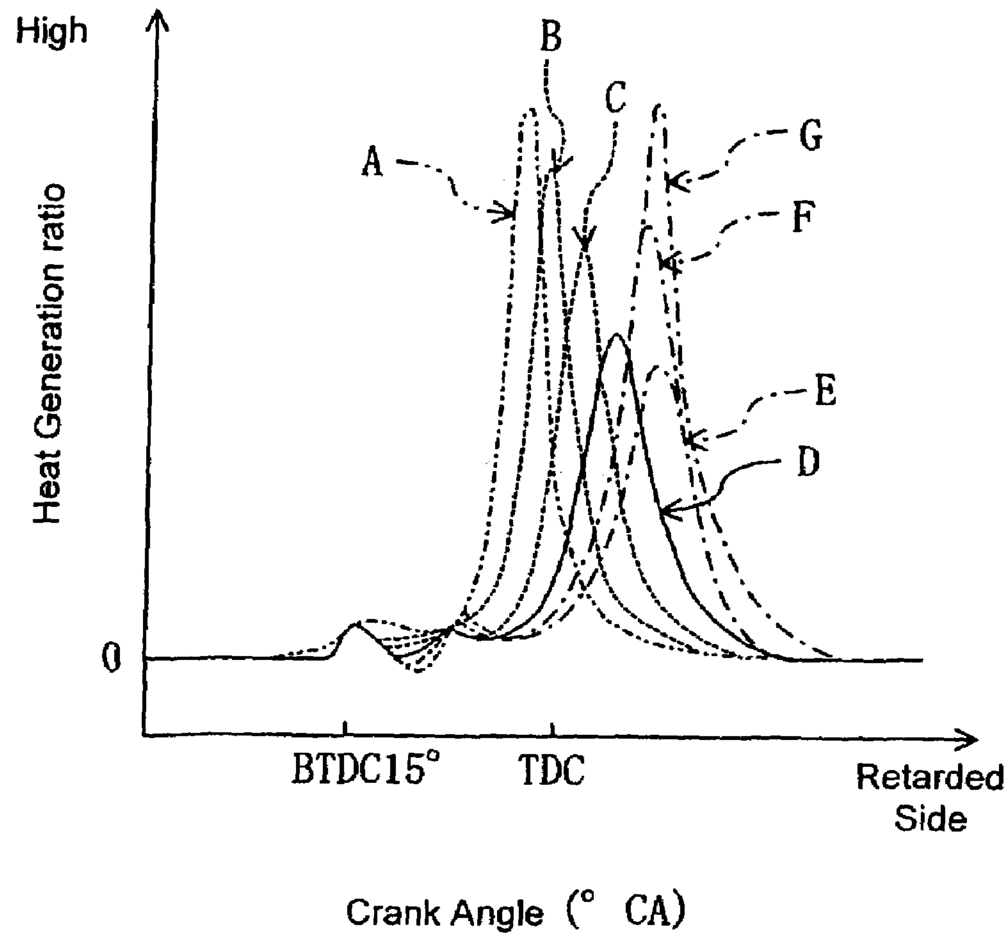
FIG. 7 is a graph illustrating the changes in the heat generation ratio with respect to the crank angle for different auxiliary-injection amounts.

The graph shown in FIG. 7 illustrates the heat generation ratio when the injection, herein referred to as main-injection, is executed at a relatively early timing of the compression stroke of the cylinder 2, for example, BTDC 30 to 45 degrees CA, and the auxiliary-injection is started at a predetermined timing at a late stage of the compression stroke, for example, near BTDC 15 degrees CA, with the EGR ratio of approximately 50% smaller than the first predetermined value in the low load region of the engine 1. The graph of FIG. 7 reveals that the ignition timing of the premixture shifts toward the retarded crank angle side for the larger fuel amount of the auxiliary-injection.

Figure 9:
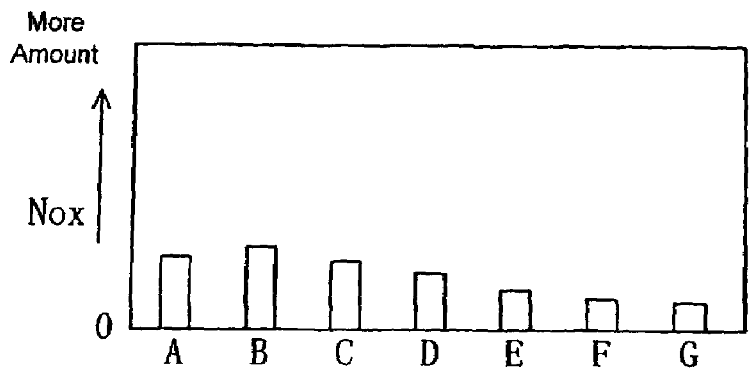
FIG. 9(*a*), (*b*), and (*c*) are graphs respectively illustrating the changes in NOx concentration, soot concentration, and engine output for different auxiliary-injection amounts, respectively.
Figure 9:
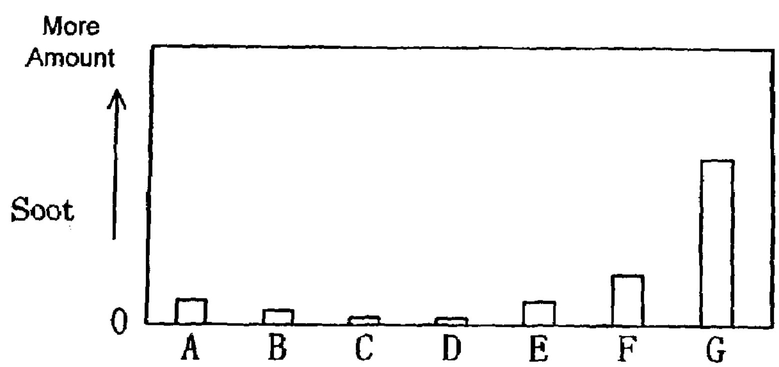
Figure 9:
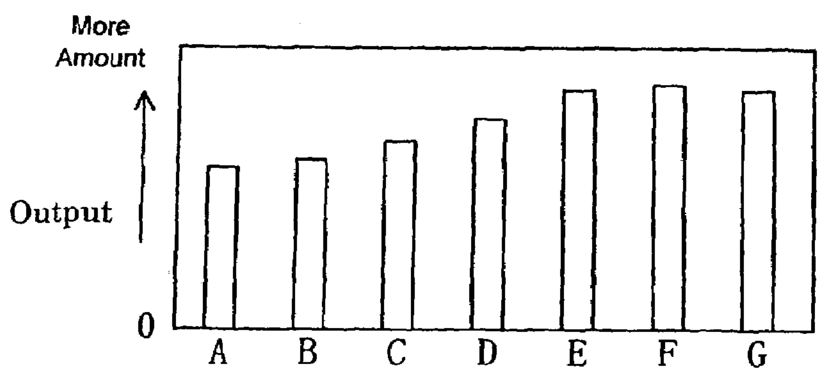

In detail, when the auxiliary-injection is not executed, i.e., the fuel amount of the auxiliary-injection is set to zero, as shown as the plot A by the phantom line in FIG. 7, a small amount of heat generation by cool flame reaction is seen from approximately BTDC 20 degrees CA, and the heat generation ratio abruptly rises at approximately BTDC 8 degrees CA, until reaching the relatively high peak prior to TDC. In this case, the EGR ratio which is smaller than the first predetermined value causes the premixture to ignite at an unduly early time, accordingly, as shown in FIGS. 9(*a*) and (*b*), a large amount of NOx and soot is produced, and as shown in FIG. 9(*c*), the engine output is relatively lowered. This causes degradation in fuel efficiency.

Figure 8:
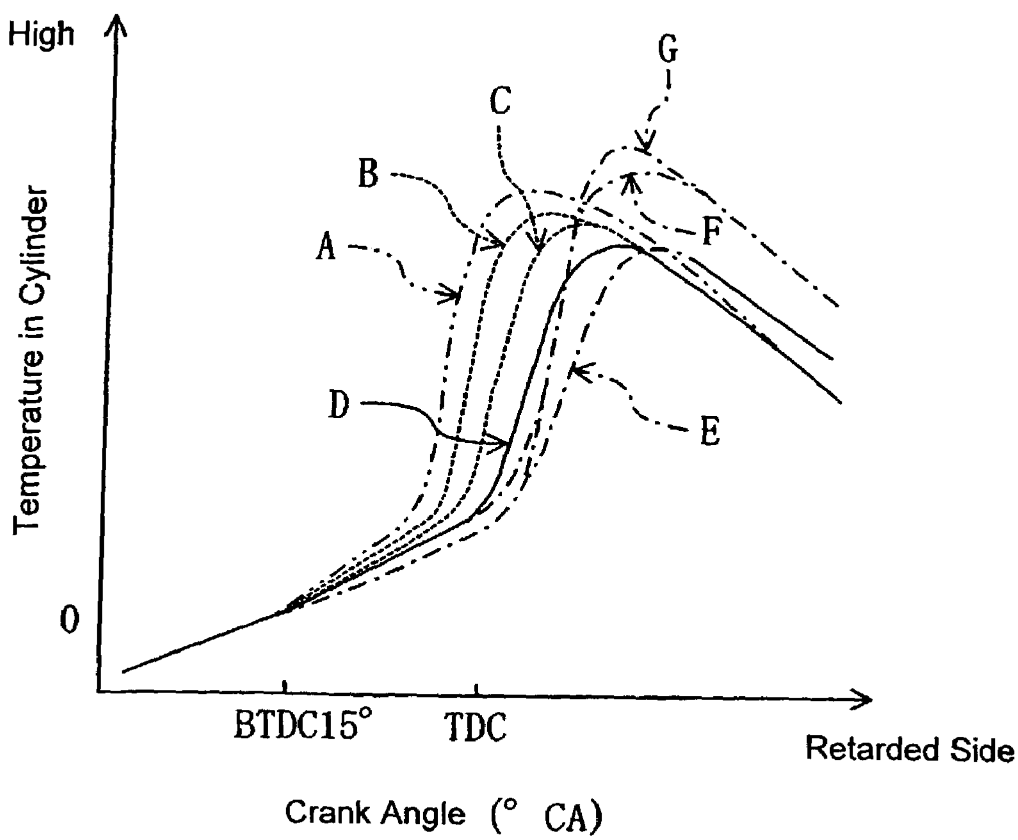
FIG. 8 is a graph illustrating the changes in the combustion chamber temperature with respect to the crank angle for different auxiliary-injection amounts.

On the other hand, when the auxiliary-injection is executed, as shown by broken lines B and C, and a solid line D in FIGS. 7 and 8 respectively, the heat generation ratio temporarily lowers at approximately BTDC 15 to 10 degrees CA to gently raise the 10 temperature in the cylinder, and the ignition timing at which the heat generation abruptly rises shifts toward the retarded crank angle side. At this time, for the same total amount of fuel injection summing up the main-injection amount and the auxiliary-injection amount, as the auxiliary-injection amount increases in the order of the plots B, C, and D (the ratio of the auxiliary-injection amount to the total injection amount is approximately 14%, approximately 23%, and approximately 33% respectively.), the ignition timing gradually shifts toward the retarded side and the gradient of the rise in heat generation ratio becomes gentle. Subsequently, when the auxiliary-injection amount becomes approximately equal to the main-injection amount as shown by solid line D and dash-dotted line E (the ratio of the auxiliary-injection amount is 58% for the plot E), the ignition occurs substantially at TDC, with the optimum heat generation characteristic of high cycle efficiency.

Such delay of the ignition timing by the auxiliary-injection can be attributed to the heat of the surrounding premixture being absorbed by the vaporization of the fuel by the auxiliary-injection and the temperature is thus decreased. Especially, a pre-flame reaction before the self-ignition of the premixture can be roughly categorized into a oxidation reaction at relatively low temperature during which fuel and oxygen reacts to produce an intermediate product, this reaction is defined as the cool flame reaction, and the oxidation reaction at relatively high temperature during which the intermediate product is generated and fuel and oxygen reacts to produce water and carbon dioxide. This reaction is defined as the hot flame reaction. Once the hot flame reaction starts, the reaction is supposed to explosively progress.

Such progress of the pre-flame reaction is greatly influenced by the density of the fuel and oxygen and temperature of the surrounding gas. When the temperature and density are relatively low, the hot flame reaction is reached after a relatively long duration of the cool flame reaction. Occasionally, the hot flame reaction may not be reached and the engine misfires. In contrast, when the temperature and density are relatively high, the hot flame reaction is immediately reached after only a short duration of the cool flame reaction.

In view of the above, if the auxiliary-injection is executed before the occurrence of the cool flame reaction, the fuel by the auxiliary-injection unites with the premixture formed by the main-injection so as to form partially unduly rich mixture. Under this high fuel density in the unduly rich mixture, the hot flame reaction should occur at an early timing. On the other hand, if the auxiliary-injection is executed after the occurrence of the cool flame reaction, a part of fuel is already consumed by the cool flame reaction before the vaporization of the fuel by the auxiliary-injection and mixture with locally high density is thus unlikely to be formed. In this case, the temperature of the premixture is decreased by latent heat of the vaporization of fuel by the auxiliary-injection to delay the occurrence of the hot flame reaction.

However, once the hot flame reaction occurs in the premixture because of the unduly late timing of the auxiliary-injection, the combustion can not be controlled to terminate, even though the temperature of the mixture is lowered by the auxiliary-injection as described above. Thus, the auxiliary-injection at an unduly late timing has no effect, and the auxiliary-injection is thus preferably executed within a timing between approximately 20 and approximately 10 degrees CA for example. More preferably, the injection start of the auxiliary-injection is set within a timing approximately between 20 25 and 15 degrees CA. When the auxiliary-injection is unduly late, most of fuel by the auxiliary-injection combusts during the diffusion combustion. This is ineffective for delaying the ignition, and causes the problem of increased soot concentration due to the combustion of fuel by auxiliary-injection.

In short, when the main-injection is executed at a relatively early timing in the compression stroke of the cylinder 2 and the auxiliary-injection is executed at a predetermined timing at a late stage of the compression stroke just before or after the cool flame reaction is caused by the temperature rise in the combustion chamber 4 in the premixture formed by the fuel of the main-injection, the temperature of the premixture can be lowered by the latent heat of vaporization of fuel by the auxiliary-injection to delay the ignition timing. Accordingly, when the EGR ratio is less than the first predetermined value for example, the ignition timing can be controlled by the adjustment of the auxiliary-injection amount.

However, when the fuel amount of the auxiliary-injection executed at a late stage of the compression stroke of the cylinder 2 is unduly increased, the ratio of the diffusion combustion to the overall combustion is abruptly increased, which results in a high cylinder temperature due to the abrupt beat generation near TDC, as shown in plots F and G of FIGS. 7 and 8 by the dash-dotted lines. The ratios of the auxiliary-injection amount are 78% and 100%, respectively. This causes intense combustion at high combustion velocity, so as to abruptly increase the soot production as shown in FIG. 9(*b*).

Therefore, the combustion control apparatus A of the preferred embodiment of the present invention controls the injectors 5 of the respective cylinders 2 to execute the auxiliary-injection in addition to the main-injection, and properly adjusts the amount of the auxiliary-injection so as to optimize the ignition timing, when the engine is in the premixed combustion region (H). Especially, in view of the empirical results above, the ratio of auxiliary-injection amount to the total amount of fuel injection is preferably set within approximately 20 to approximately 70%, and more preferably, within approximately 30 to approximately 60%.

A control process of the injector 5 by the ECU 40 will now be described i detail with reference to the flowcharts illustrated in FIGS. 10 and 11. At step SA1 of FIG. 10, just after the process starts, at least an output signal of the fuel pressure sensor 7, an output signal of the crank angle sensor 11, an output signal of the intake air pressure sensor 18, an output signal of the air flow sensor 19, an output of the linear 02 sensor 29, an output signal of the acceleration sensor 39, and other output signals are inputted, and a variety of data stored in a memory of the ECU 40 are read (data input). At following step SA2, a target torque Trq of the engine 1 is determined with reference to a target torque map based upon the acceleration pedal position Acc and the engine rotational speed Ne calculated from the crank angle signal. The target torque map holds the optimum value empirically predetermined corresponding to the acceleration pedal position Acc and the engine rotational speed Ne, and is stored in the memory of the ECU 40. As shown in FIG. 12(*a*) by way of example, the target torque Trq is set so as to be increased for the larger acceleration pedal position Acc and for the larger engine rotational speed Ne.

At following step SA3, a combustion mode of the engine 1 is judged with reference to a combustion mode map (refer to FIG. 2). Especially, a judgement is made as to whether the engine is in the premixed combustion region (H) or not according to the target torque Trq and the engine rotational speed Ne. If YES, that is, the engine is judged to be in the premixed combustion region (H), the sequence proceeds step SA6, which will be described herein. If NO, that is, the engine is judged to be in the diffusion combustion region (D), the sequence proceeds to step SA4, where a basic injection amount QDb is read from the diffusion combustion region (D) in the injection amount map shown in FIG. 12(*b*), based on the target torque Trq and the engine rotational speed Ne. In the same manner, a basic injection timing ITIDb, a crank angle position when a needle of the injector 5 opens, is read from an injection timing map shown in FIG. 12(*c*). Then, the values are subjected to predetermined corrective calculations, respectively, to provide the fuel injection amount QD and the fuel injection timing ITD. Next, the sequence proceeds to step SB1 in the flowchart of FIG. 11, where the injector 5 of each cylinder 2 injects fuel, as will be described herein, and the sequence returns.

Particularly, the injection amount map and the injection timing map hold the optimum values empirically predetermined corresponding to the target torque Trq and the engine rotational speed Ne, and are electronically stored in the memory of the ECU 40. In the injection amount map, the value of the basic injection amount QDb for the diffusion combustion region (H) is set so as to be increased for a larger acceleration pedal position Acc and for a larger engine rotational speed Ne. Additionally, in the injection timing map, the value of the basic injection timing ITDb for the diffusion region (D) is set in association with the fuel injection amount and the fuel pressure (the common rail pressure) so that the termination timing of the fuel injection (the crank angle when the needle of the injector 5 closes) is at a predetermined timing after the top-dead-center of the compression stroke and the fuel spray favorably causes the diffusion combustion.

Figure 13:
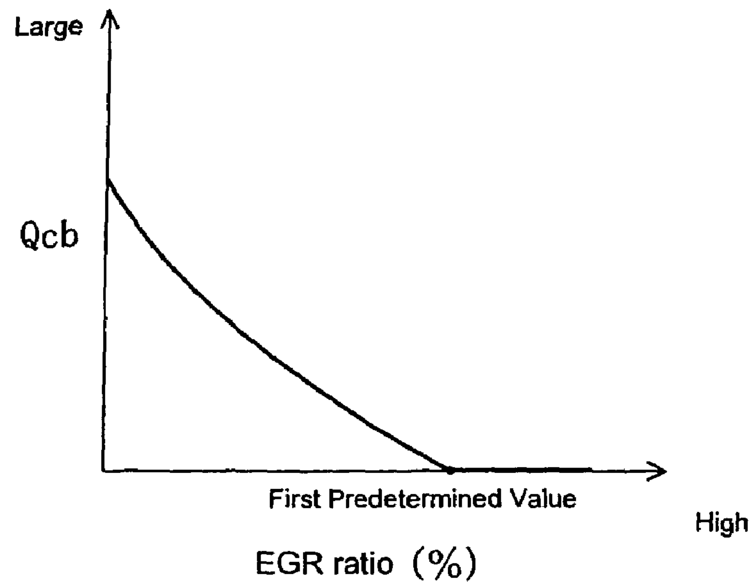
FIG. 13(*a*) is a graph showing a table prescribing the basic injection amount for the auxiliary-injection with respect to the change in the EGR ratio, and (*b*) a graph prescribing the first corrective amount for the auxiliary-injection with respect to the change in the EGR deviation, respectively.
Figure 13:
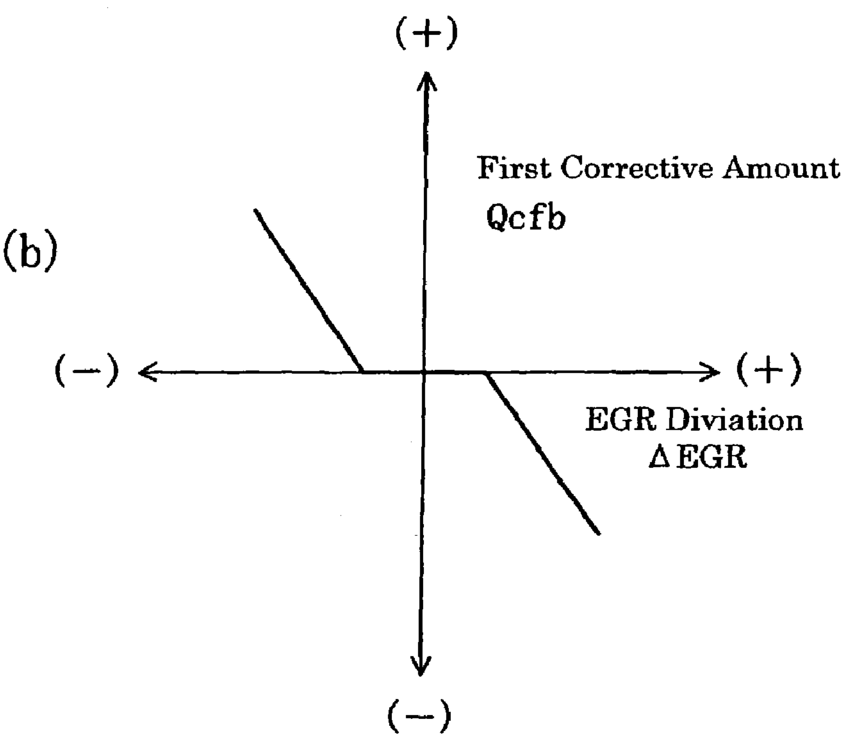

On the other hand, if step SA3 judges NO, that is, the engine 1 is judged to be in the premixed combustion region (H), firstly, basic fuel injection amount QHb and Qcb and basic fuel injection timing ITHb and ITHc are respectively set for the premixed compressive ignition combustion. At step SA6, the basic injection amount QHb for the main-injection executed at a relatively early timing in the compression stroke of the cylinder 2 is read from the premixed combustion (H) in the injection amount map, and the basic injection amount Qcb for the auxiliary-injection executed at a late stage of the compression stroke of the cylinder 2 is read from the injection amount table. The injection amount table holds the optimum value empirically predetermined corresponding to a target EGR ratio EGRnf preferably set within a range between 50% and 60%, which will be described later herein in detail, determined based on the engine operational condition (the target torque Trq and the engine rotational speed ne) and is electronically stored in the memory of the ECU 40. In this table, as shown in FIG. 13(*a*), the basic injection amount Qcb is set equal to zero when the EGR ratio is the first predetermined value or more, and the Qcb is set so as to be gradually increased for the lower EGR ratio when the EGR ratio is lower than the first predetermined value. The value of the target EGR ratio EGRnf is determined with reference to the EGR map based on the engine operational condition, in the EGR control process described later.

Then, at step SA7, a basic injection timing ITHb for the main-injection (a crank angle when the needle of the injector 5 opens) is read from the premixed combustion region (H) in the injection timing map, and an auxiliary-injection timing Itc is read from the memory of the ECU 40. As described above, the auxiliary-injection timing Itc is empirically prescribed such that its optimum value is within a range at the end of the compression stroke, for example, BTDC 20 to 10 degrees CA, after the premixture by fuel of the main-injection causes the cool flame reaction, and is electronically stored in the memory of the ECU 40.

Especially, in the injection amount map, the value of the basic injection amount QHb for the premixed combustion region (H) is set so as to be increased for the larger accelerator pedal position Acc, and for the larger engine rotational speed Ne. Additionally, in the injection amount map, the value of the basic injection timing ITHb for the premixed combustion region (H) is set so as to be advanced for the larger accelerator pedal position Acc, and for the larger engine rotational speed Ne, and is set corresponding to the fuel injection amount and the fuel pressure within a predetermined crank angle range in the compression stroke of the cylinder 2, for example, BTDC 90 to 30 degrees CA, preferably BTDC 60 to 30 degrees CA, so that most of the fuel spray combusts after it has been well mixed with air.

Then, at step SA8, the actual EGR ratio of the engine 1 is estimated, and the estimated value (the actual EGR ratio EGR) is updated and stored in the memory of the ECU 40. For estimating the actual EGR ratio EGR, for example, any adequate calculation may be used that estimates the value according to the intake air amount determined based on the signals from the air-flow sensor 19, the oxygen concentration determined based on the signals from the linear O2 sensor 29, and fuel injection amount.

Next, at step SA9, an EGR deviation ΔEGR is determined by subtracting the actual EGR ratio EGR from the target EGR ratio EGRnf.

Then, at step SA10, a first corrective amount Qcfb for the fuel injection amount corresponding to the EGR deviation ΔEGR is set. Particularly, the memory of the ECU 40 electronically stores a correction table shown in FIG. 13(*b*) by way of example, from which the first corrective amount Qcfb corresponding to the EGR deviation ΔEGR determined at step SA9 is read. The correction table holds the empirically predetermined optimum value of the first corrective amount, Qcfb corresponding to the EGR deviation Δ EGR. As shown, if the EGR deviation ΔEGR is a positive value the first corrective amount Qcfb is a negative value, and if the EGR deviation Δ EGR is a negative value, the first corrective amount Qcfb is a positive value. In any case, as the absolute value of the EGR deviation Δ EGR increases, the absolute value of the first corrective amount Qcfb increases in a substantially proportional manner. In addition, a dead zone is defined which provides the first corrective amount Qcfb of zero, when the absolute value of the EGR difference ΔEGR is the predetermined value or less.

Next, at step SA11, a judgement is made as to whether the engine 1 is in a predetermined accelerating condition or not. For example, the accelerating condition is judged if the accelerator pedal position Acc is on increase and the change in the amount is larger than the predetermined value. If YES, the sequence proceeds to step SA12, described later herein. If No, that is, the engine is not in the accelerating condition or the engine 1 is in the steady operational condition, the sequence proceeds to step SB1 of the control process shown in FIG. 11. At step SB1, a rate of change in the rotational speed of the crank shaft 10, that is, a crankangular velocity changing rate, is calculated according to the signals from the crank angle sensor 11.

Especially, the crank angular velocity changing rate is determined by subtracting the next to last crank angular velocity from the last crank angular velocity, and stored in the memory of the ECU 40.

Then, at step SB2, a judgement is made as to whether the crank angular velocity has lowered or not. Particularly, the judgement is made based on the sign and absolute value of crank angular velocity changing rate. If the sign of the crank angular velocity changing rate is negative and its absolute value is greater than a predetermined judgement threshold, NO is judged, that is, the crank angular velocity is judged to have increased, then the sequence proceeds to step SB6, described later herein. On the other hand, if the sign of crank angular velocity changing rate is negative and its absolute value is greater than the predetermined judgement threshold, YES is judged, that is, the crank angular velocity is judged to have decreased, then the sequence proceeds to step SB3. If the absolute value of the crank angular velocity changing rate is judged to be the judgement threshold or less, the step SB2 makes the same judgment as that in the previous control cycle.

Next, at step SB3, a judgement is made as to whether the auxiliary-injection amount was increased in the previous control cycle. That is, for example, if the value determined by subtracting the next to last auxiliary-injection amount from the last auxiliary-injection amount, which are stored in the memory of the ECU 40, is greater than zero, YES is judged, and the sequence proceeds to step SB4, where a second corrective amount Qcfr for the fuel injection amount corresponding to the engine torque fluctuation is set. Particularly, a new second corrective amount Qcfr is determined by subtracting a predetermined amount a from the second corrective amount Qcfr in the previous control cycle. On the other hand, if the auxiliary-injection amount in the last control cycle is smaller than that in the next to last control cycle step SB2 judges NO and the sequence proceeds to step SB5. At step SB5, a new second corrective amount Qcfr is determined by adding a predetermined amount a to the second corrective amount Qcfr in the previous control cycle.

In short, when the decrease in crank angular velocity results from the increase in the auxiliary-injection amount, the auxiliary-injection amount is decreased for accommodating the decrease in the output torque of the engine. When the decrease in crank angular velocity results from the decrease in the auxiliary-injection amount, the auxiliary-injection amount is increased.

At step SB6 to which the sequence proceeds after judging NO, that is, after judging that the crank angular velocity has increased at step SB2, a judgement is made as to whether the auxiliary-injection amount was increased at the previous control cycle in the same manner as step SB3. If YES, the sequence proceeds to step SB7 where a second corrective amount Qcfr is determined by adding a predetermined amount a to the second corrective amount Qcfr in the previous control cycle. If NO, that is the auxiliary-injection amount is decreased, the sequence proceeds to step SB8 where a new second corrective amount Qcfr is determined by subtracting a predetermined amount a from the second corrective amount Qcfr in the previous control cycle.

In short, when the increase in crank angular velocity, or the increase in output torque of the engine 1 results from the increase in the auxiliary-injection amount, the auxiliary-injection amount is further increased. Then the increase in crank angular velocity results from the decrease in the auxiliary-injection amount, the auxiliary-injection amount is further decreased.

At step SB9, after steps SB4, SB5, SB7, and SB8, the auxiliary-injection amount Qct is calculated by summing up the basic injection amount Qcb, the first corrective amount Qcfb, and the second corrective amount Qcfr. Next, at step SB10, the auxiliary-injection amount Qct calculated at step SB9 is corrected so as not to exceed a predetermined upper limit Qcg. Particularly, a map is prescribed which provides the upper limit Qcg corresponding to the target torque Trq and the engine rotational speed Ne, and the upper limit Qcg read from the map, is compared with the auxiliary-injection amount Qct. If Qct less than or equal to Qcg, the value of the Qct is maintained without correction, and if Qct>Qcg, the value of the Qcg is determined as Qct.

Next, at step SB11, a main-injection amount QHt is determined based on the basic injection amount QHb for the main-injection determined at step SA6 and the auxiliary-injection amount Qct corrected at step SB10. Because the combustion of fuel by the auxiliary-injection contributes to the output torque of the engine 1, the amount for the contribution is subtracted from the basic injection amount QHb to determine the final main-injection amount QHt. Then, at step SB12, the injector 5 is controlled to execute the main-injection of fuel at the fuel injection timing ITHt in the compression stroke of the cylinder 2, and then the injector 5 is controlled to execute the auxiliary-injection at the fuel injection timing ITc, in each of the cylinders 2 of the engine 1, subsequently, the sequence returns.

In short, while the engine 1 is in a stable condition, the auxiliary-injection amount is correctively increased or decreased compulsorily and often, and the change in output torque of the engine 1 is detected based on the change in crank angular velocity. In accordance with the detected result, the auxiliary-injection amount is controlled to provide the maximum amount of the output torque.

At step SA12 to which the sequence proceeds after judging YES, that is, after judging the engine 1 is in an accelerating condition at step 10 in FIG. 10 described above, the second corrective amount Qcfr is set to zero, then the sequence proceeds to steps 9 through 12 in FIG. 11, described above, where the injector is controlled to execute the main-injection and the auxiliary-injection in each of the cylinders 2 of the engine 1, subsequently, the sequence returns. That is, the correction of the auxiliary-injection amount based on the change in crank angular velocity is not performed during the accelerating condition of the engine 1.

Figure 10:
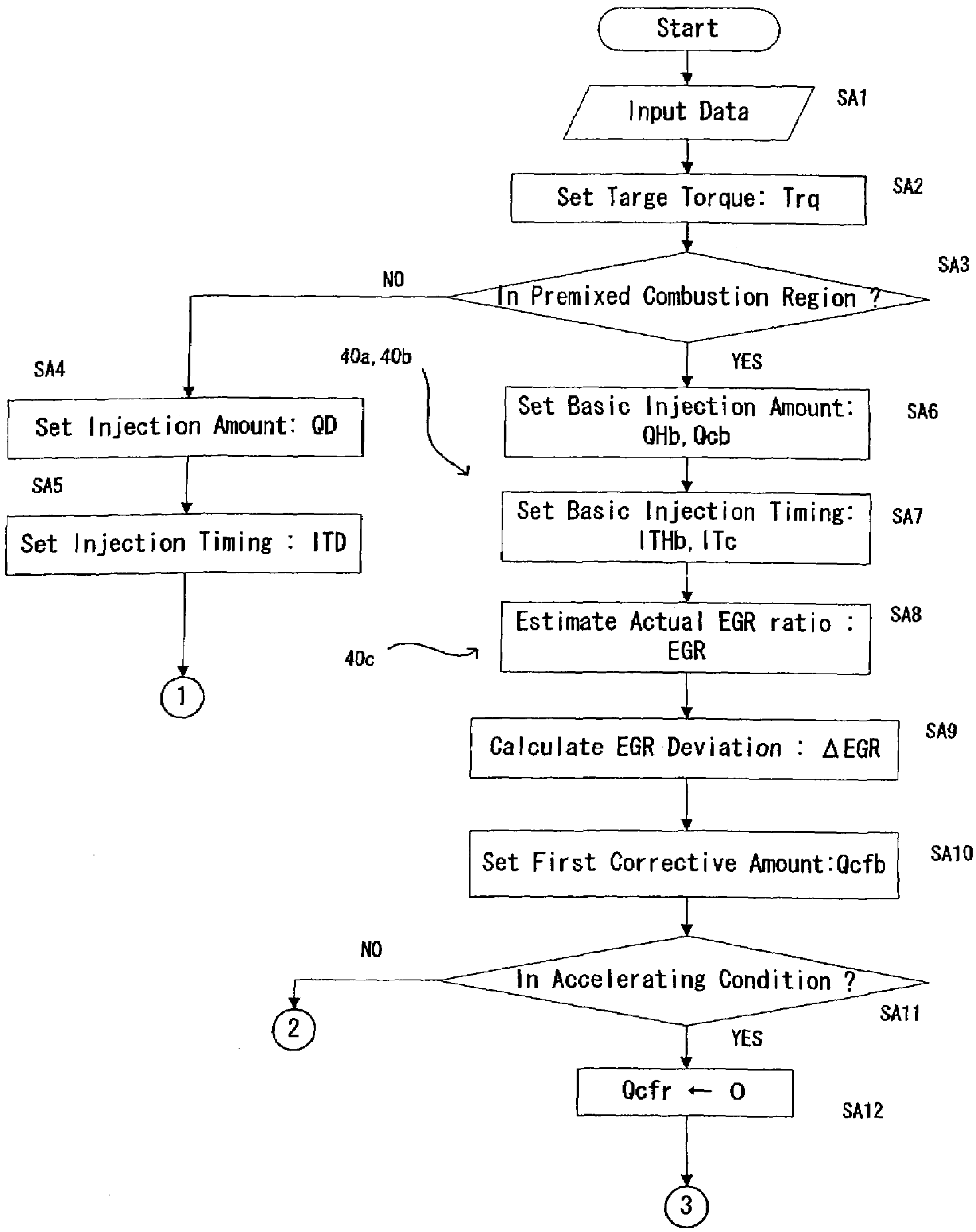
FIG. 10 is a flowchart illustrating the early stage of the fuel injection control process.
Figure 11:
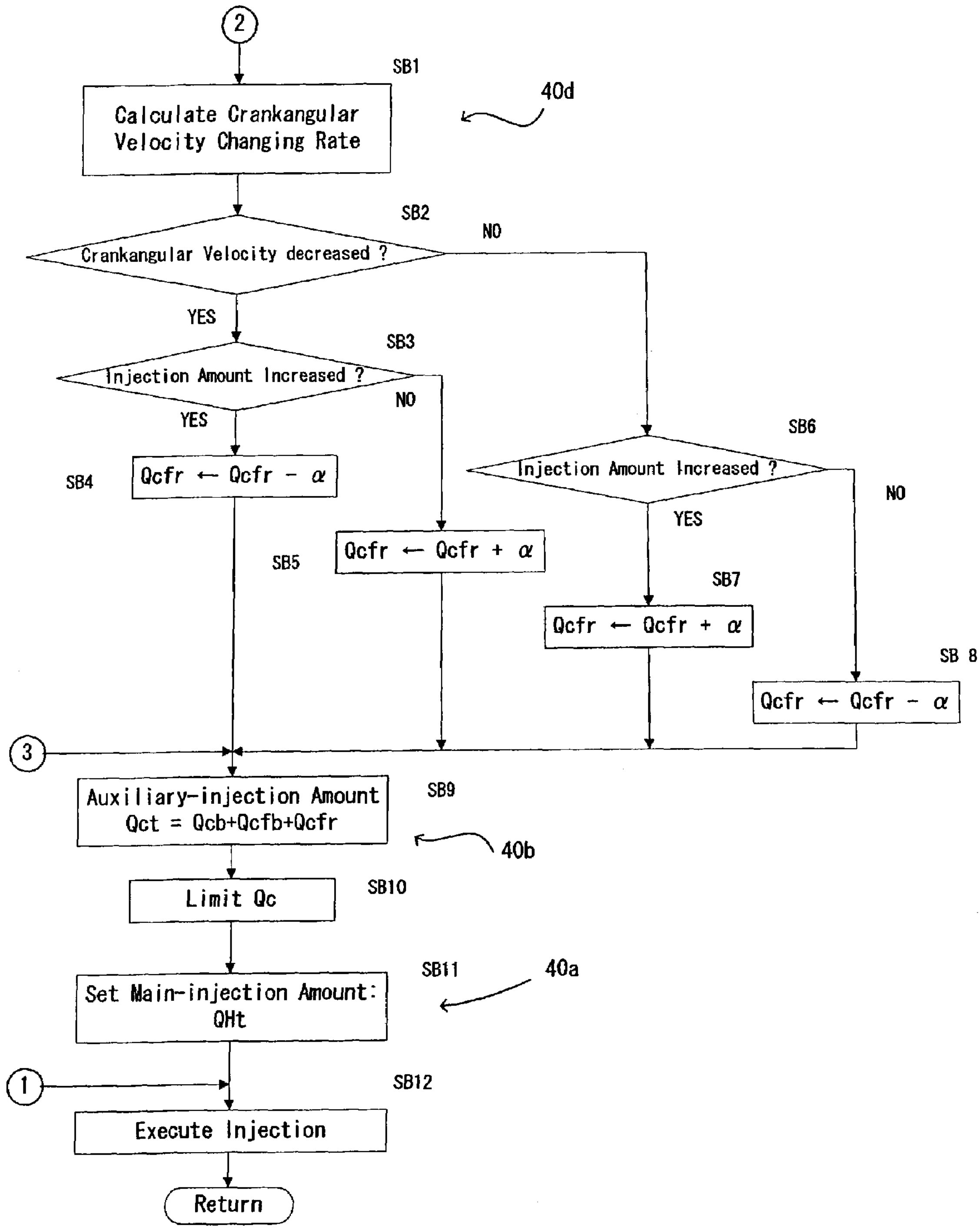
FIG. 11 is a flowchart illustrating the late stage of the fuel injection control process.
Figure 12:
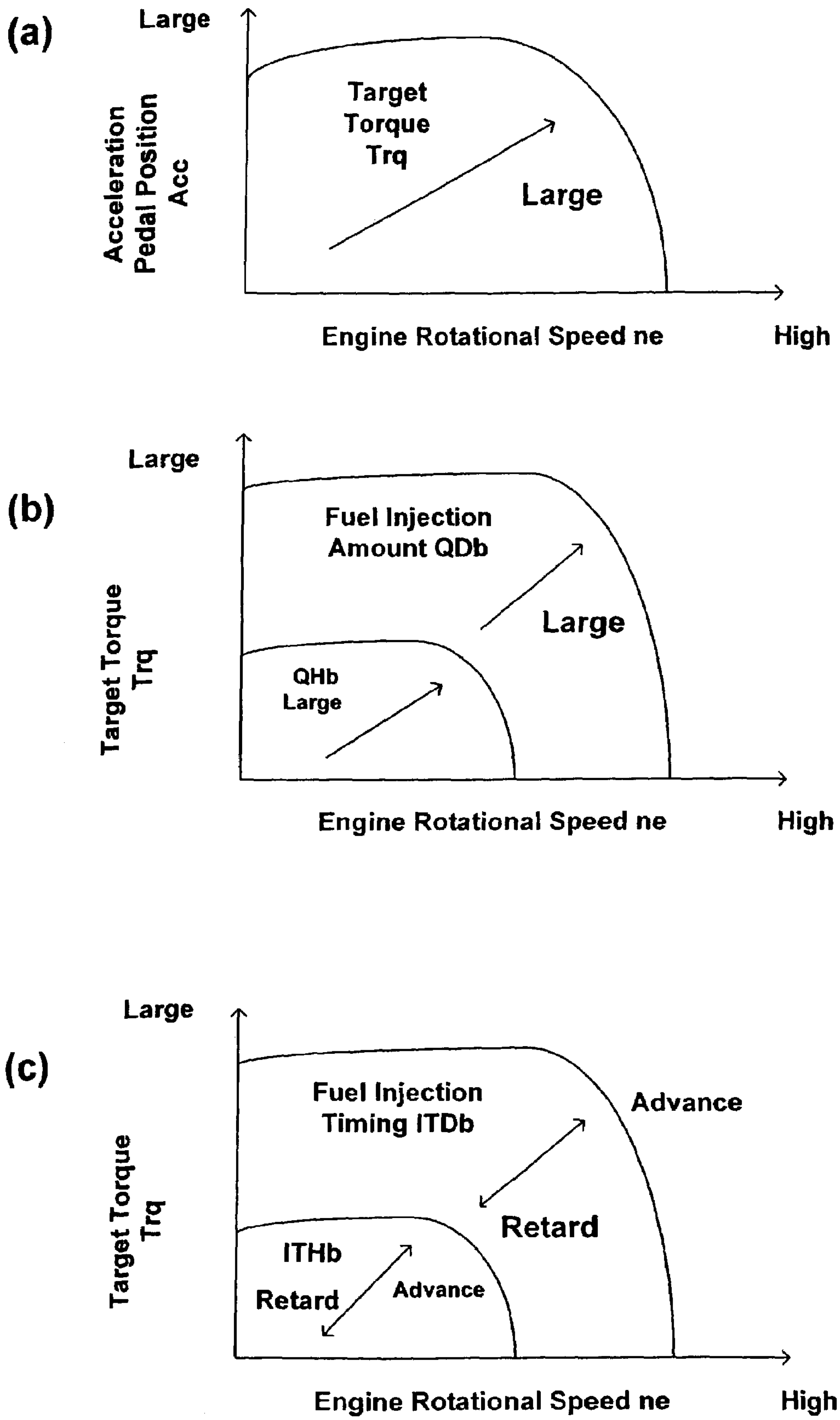
FIG. 12(*a*), (*b*), and (*c*) are graphs showing examples of a target torque map for the engine, an injection amount map, and an injection timing map, respectively.

In the control process shown in FIGS. 10 and 11 described above, steps SA6, SA7, SB11, and SB12 constitute the main-injection controller 40*a* (main-injection control means) which controls the injector 5 to execute the main-injection within the predetermined crank angle range in the compression stroke of the cylinder 2 to provide the premixed compressive ignition combustion, while the engine 1 is in the premixed compressive ignition combustion region (H) defined on the low engine load side, i.e., in the predetermined operational condition.

In the control process, steps SA6, SA7, SA9, SA10, S132 through SB10, and SB12 constitute the auxiliary-injection controller 40*b* (the auxiliary-injection control means) which controls the injector 5 to execute the auxiliary-injection fuel at the predetermined timing at a late stage of the compression stroke so as to delay the shift from the cool flame reaction to the hot flame reaction, just before or after the fuel of the main-injection starts the cool flame reaction caused by the temperature increase in the combustion chamber within the compression stroke in the cylinder 2.

Additionally, in the control process in FIG. 10 described above, step SA8 constitutes the EGR estimator 40*c* (the EGR ratio estimating means) for estimating the actual EGR ratio of the engine 1. Moreover, in the control process in FIG. 11, step SB1 constitutes the crank angular velocity fluctuation detector 40*d* (the engine torque detecting means) for detecting the crank angular velocity changing rate of the engine 1 as a value associated with the output torque. Furthermore, the auxiliary-injection control means 40*b* adjusts the auxiliary-injection amount so that the premixture ignites within the predetermined range near TDC, according to the detected results of the EGR estimator 40*c* and the crank angular velocity fluctuation rate detector 40*d*.

According to the control process of the flow chart described above, the auxiliary-injection controller 40*b* increases the auxiliary-injection amount when the actual EGR ratio EGR is smaller than the first predetermined value. However, the present invention is not limited to this. For example, the auxiliary-injection controller 40*b* may increase the auxiliary-injection amount when the actual EGR ratio EGR is smaller than another value being smaller than the first predetermined value, i.e., the second predetermined value.

Next, a control process of EGR by the ECU 40 will be described in detail with reference to the flowchart illustrated in FIG. 14. At step SC1, just after the start, at least an output signal from the fuel pressure sensor 7, an output signal from the crank angle sensor 11, an output signal from the intake air pressure sensor 18, an output signal from the air flow sensor 19, an output signal from the accelerator pedal position sensor 39 and the other signals are entered (data input). In addition, values of a variety of flags stored in the memory of the ECU 40 are entered. Then, at step SC2, in the same manner as step SA3 in the control process of the fuel injection shown in FIG. 10, the combustion mode of the engine 1 is judged. If NO is judged, that is, the mode is in the diffusion combustion region (D), the sequence proceeds to step SC5. If YES is judged, that is, the mode is in the premixed combustion region (H), the sequence proceeds to SC3, where a target value EGRH of the opening of the EGR valve 35 corresponding to the engine operational condition is determined with reference to an EGR map electronically stored in the memory of the ECU 40. Next, at step SC4, the ECU transmits a control signal to the solenoid valve 37 of the diaphragm of the EGR valve 35 (for the actuation of the EGR valve), and the sequence returns.

At step SC5 to which the sequence proceeds after judging NO, that is, after judging that the engine 1 is in the diffusion combustion region (D) at step SC2, the target opening value EGRD of the EGR valve 35 corresponding to the diffusion combustion condition of the engine 1 is read from the EGR map. Next, the sequence proceeds to step SC4 where the EGR valve 35 is actuated, and then returns.

Figure 15:
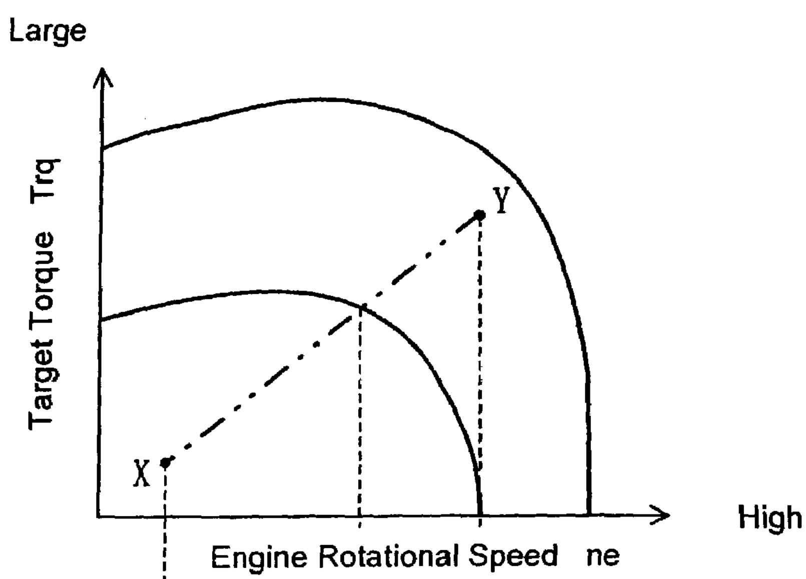
FIGS. 15(*a*) and (*b*) are graph diagrams showing examples of an EGR map, and the change in the opening of the EGR valve on the EGR map, respectively.
Figure 15:
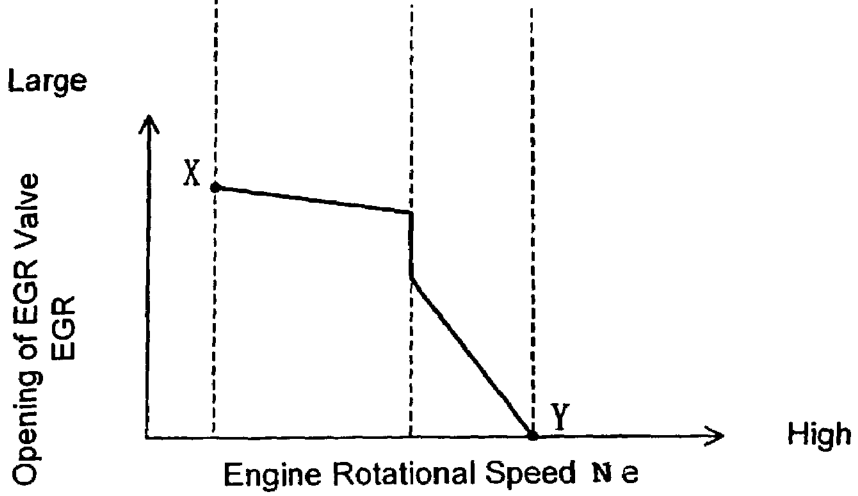

The EGR map holds the optimum opening value of the EGR valve 35 corresponding to the target torque Trq and the engine rotational speed Ne empirically predetermined. Particularly, the map provides the target EGR ratio EGRnf based on the engine operational condition, such that the target EGR ratio is set to approximately 50% to 60% (Preferably, approximately 53 to 60%) in the premixed combustion region (H), and approximately 40% or less in the diffusion combustion region (D). As shown in FIG. 15(*a*) by way of example, the target opening values of the EGR valve 35 EGRH and EGRD are decreased for the larger accelerator pedal position Acc and for the larger engine rotational speed Ne, in the premixed combustion region (H) and the diffusion combustion region (D) respectively.

Particularly, each of the target values EGRH and EGRD are respectively set so that the opening of the EGR valve 35 changes as indicated in FIG. 15(*b*), as the operational condition shifts from a predetermined operational condition defined at the low engine rotational speed and low engine load side (as indicated by the point X in FIG. 15(*b*)) to a predetermined operational condition defined at the high engine rotational speed and high engine load side (as indicated by the point Y in FIG. 15(*b*)). Thus, when the engine operational condition changes along the line X-Y, the opening of the EGR valve 35 is gradually decreased towards the higher engine rotational speed and higher engine load side in the premixed combustion region (H), discontinuously decreased at the boundary between the premixed combustion region and the diffusion combustion region (D), and gradually decreased again towards the higher engine rotational speed and higher engine load side. As shown, the change in the opening of the EGR valve 35 with respect to the engine operational condition is prescribed so as to be significantly small in the premixed combustion region (H), and in contrast, relatively large in the diffusion combustion region (D).

Thus, while the engine 1 is in the premixed combustion region (H), the opening of the EGR valve 35 is relatively widened to recirculate a large amount of the exhaust gas to the intake passage 16 so as to set the EGR ratio EGR to the target value (the target EGR ratio EGRnf) being equal to or larger than the first predetermined value, thereby achieving the favorable premixed compressive ignition combustion. While engine 1 is in the diffusion combustion region (D), the engine 1 is caused to perform conventional diesel combustion during which the opening of the EGR valve 35 is relatively narrowed so as to set the EGR ratio EGR to an adequately an adequately small value, thereby suppressing NOx production without an increase in soot production.

Figure 14:
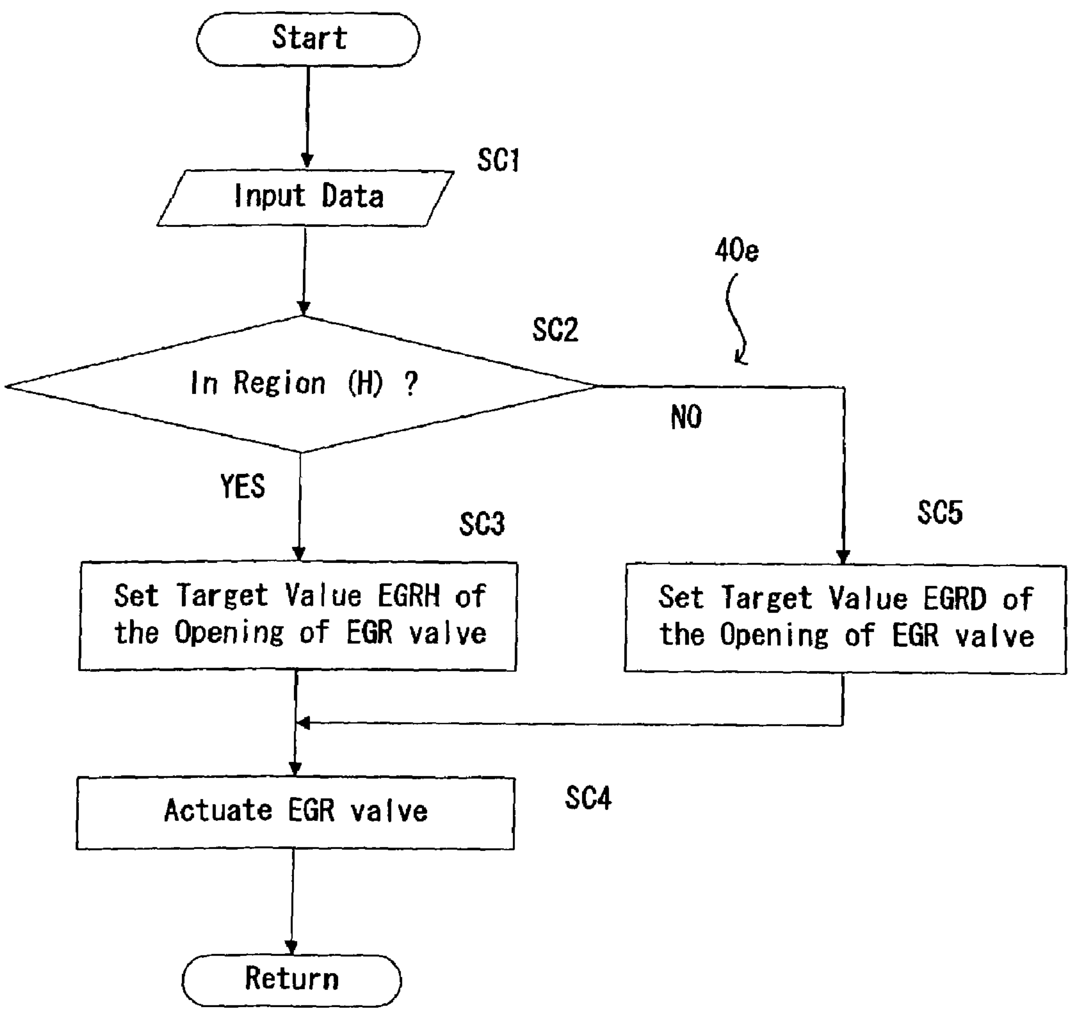
FIG. 14 is a flowchart showing the EGR control process according to the present invention.

The control process shown in FIG. 14, as a whole, constitutes the EGR controller 40*e* (the exhaust gas recirculation control means) which adjusts the opening of the EGR valve 35 so that the EGR ratio is the first predetermined value or more when the engine 1 is in the premixed combustion region (H), and the EGR ratio is smaller than the first predetermined value when the engine 1 is in the diffusion combustion region (D).

The action and effect of the combustion control apparatus for the diesel engine 1 according to the preferred embodiment of the present invention will now be described. While the engine 1 is in the premixed combustion region (H), the opening of the EGR valve is relatively widened so that exhaust gas is recirculated from the exhaust passage 26 upstream of the turbine 27 to the intake passage 16 through the EGR passage 34. Next, a considerable amount of recirculated exhaust gas is supplied to the combustion chamber 4 of the cylinder 2 together with fresh air from the outside. Then, the injector 5 projecting into the combustion chamber 4 in the cylinder 2 executes the main-injection at the predetermined timing in the compression stroke of the cylinder 2. This fuel injected during the main-injection is relatively widely diffused over the combustion chamber 4 and sufficiently mixed with intake air (fresh air and the recirculated exhaust gas) so as to form a highly homogenized mixture.

This mixture begins the oxidation reaction at a relatively low temperature (so called cool flame reaction) by the temperature rise in the combustion chamber 4 during the compression stroke of the cylinder.

At this time, the cool flame reaction of mixture starts particularly the portion with high density of the fuel vapor and high density of oxygen. However, this mixture contains a large amount of exhaust gas (carbon dioxide and other gas) being larger in heat capacity than air (nitrogen, oxygen, and other gas), and the density of the fuel and oxygen is small as a whole because of the large content of the exhaust gas. Furthermore, the reaction heat of the cool flame reaction is absorbed by carbon dioxide being large in heat capacity.

Therefore, local rapid reaction is prevented and the shift to the oxidation reaction at high temperature (so called hot flame reaction) is thus avoided. Subsequently, the injector 5 executes the auxiliary-injection to inject fuel at the predetermined timing at a late stage of the compression stroke into the mixture which has started cool flame reaction as described above. This fuel, during its vaporization, absorbs heat from the surrounding mixture, which lowers the temperature of the mixture, thereby further delaying the shift to the hot flame reaction, that is, ignition.

Next, the mixture simultaneously ignites and combusts, when the TDC is approached in the cylinder 2, gas temperature in the combustion chamber 4 further rises, and the density of the fuel and oxygen sufficiently increases. The ignition timing depends mainly on the ratio of the amount of recirculated exhaust gas in the intake air (the EGR ratio), the recirculated exhaust gas temperature, and the auxiliary-injection fuel amount. Even if the EGR ratio is lower than an initial target value, or even if the recirculated exhaust gas temperature is particularly high, the ratio and temperature are taken into account in the adjustment of the auxiliary-injection amount, thereby maintaining the ignition timing of the mixture within the range near TDC. That is, even when, for example, the acceleration of the engine 1 temporally decreases the recirculation ratio of the exhaust gas to the combustion chamber 4 or even when the long time driving raises the exhaust gas temperature to an extreme degree, the auxiliary-injection amount is controlled to optimize the ignition timing of mixture. Thus, the heat generation characteristic with high cycle efficiency is constantly attained, thereby improving fuel efficiency.

Additionally, in the mixture which ignites and combusts in the abovementioned manner, fuel vapor, air, and recirculated exhaust gas have been already homogeneously distributed sufficiently and the cool flame reaction is in progress with the portion of mixture being high in fuel density as described above, with a little of the mixture being unduly high in fuel density. Thus, no soot is produced.

Moreover, as described above, the fuel vapor is homogeneously distributed in the mixture and a considerable amount of carbon dioxide and other gas are homogeneously diffused, which prevents locally abrupt heat generation in the mixture even when the mixture simultaneously ignites and combusts. Furthermore, because the surrounding carbon dioxide and the other gas absorbs the combustion heat, the rise in combustion temperature is suppressed, thereby greatly suppressing NOx generation.

While the engine 1 is in the diffusion combustion region (D), the injector 5 injects fuel into the combustion chamber 4 at least near TDC to cause diffusion combustion after the initial premixed combustion (the conventional diesel combustion).

At this time, the opening of the EGR valve 35 is relatively narrowed, so that the proper amount of the recirculated exhaust gas suppresses the generation of NOx and soot. Additionally, the recirculation ratio of the exhaust gas is set to the predetermined value or less, which ensures the supply of fresh air, thereby achieving the sufficient engine output.

It should be appreciated that the invention is not limited to the preferred embodiment as described above. Particularly, for example, in the forgoing embodiment, the auxiliary injection amount is adjusted based on both the actual EGR ratio EGR and crank angular velocity changing rate. However, the amount may be adjusted based on only one of the above. Additionally, the auxiliary-injection amount may be adjusted in view of other factors influencing the ignition delay time, such as the engine coolant temperature, intake air temperature, and charging pressure.

Though in the foregoing embodiment, the injector 5 starts injecting fuel within the predetermined crank angle range during the compression stroke of the cylinder 2 while the engine 1 is performing the premixed compressive ignition combustion, the present invention is not limited to this. For example, fuel injection may start during the intake stroke of the cylinder 2.

Additionally, though the foregoing embodiment relates the present invention to a combustion control apparatus A for a direct-injection diesel engine with a common-rail, the present invention is not limited to this. For example, the present invention may apply to a gasoline engine which causes the premixture with gasoline to self-ignite without the use of a spark plug in the predetermined operational condition.

As described above, according to the combustion control apparatus in accordance with the present invention, in a direct-injection diesel engine in which fuel injected during the main-injection into the combustion chamber is well mixed with intake air during the ignition delay time of the mixture provided by a large amount of exhaust gas recirculation, to attain a combustion condition with relatively large ratio of the premixed combustion, the transition from the cool flame reaction to the hot flame reaction caused in the compression stroke of the cylinder by the premixture formed of the fuel by the main-injection can be delayed by fuel of the auxiliary-injection.

Further, even when the recirculation ratio of the exhaust gas is widely changed or even when the exhaust gas temperature is fluctuated by the change in the operational condition of the engine, the ignition timing of the premixture is optimized by the adjustment of the auxiliary-injection amount, so that the heat generation characteristic with high cycle efficiency is attained, thereby improving fuel efficiency.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A combustion control apparatus for an engine, comprising:

a fuel injector extending into a combustion chamber of a cylinder of the engine, exhaust gas recirculation regulator means for adjusting the amount of the exhaust gas recirculated to the combustion chamber;

main-injection control means for controlling the injector to inject fuel at a timing during an intake stroke or a compression stroke to achieve a combustion in which a ratio of a premixed combustion is larger than that of a diffusion combustion when the engine is in a predetermined operational condition;

exhaust gas recirculation control means for controlling said exhaust gas recirculation regulator means, so that an exhaust gas recirculation value associated with the recirculation amount of the exhaust gas is a first predetermined value or more when the engine is in the predetermined operational condition; and auxiliary-injection control means for controlling the injector to perform auxiliary-injection at a predetermined timing at a late stage of the compression stroke, wherein said predetermined timing is a timing where fuel by the auxiliary-injection delay a transition from a cool flame reaction to a hot flame reaction caused by the compression stroke of the cylinder at increasing temperature by a premixture of the fuel occurring during the main-injection, wherein said auxiliary-injection control means further adjusts the auxiliary-injection amount according to an engine operational condition so that the transition form the cool flame reaction to the hot flame reaction occurs within a predetermined period near the top-dead-center of the compression stroke of the cylinder.

2. A combustion control apparatus for an engine as claimed in claim 1, wherein, said auxiliary-injection control means adjusts the auxiliary-injection amount of fuel according to at least the exhaust gas recirculation value.

3. A combustion control apparatus for an engine as claimed in claim 2, further comprising, exhaust gas recirculation ratio estimating means for estimating an actual exhaust gas recirculation value of the engine, and wherein said auxiliary-injection control mean adjusts the auxiliary-injection amount according to at least the value estimated by the exhaust gas recirculation ratio estimating means.

4. A combustion control apparatus for an engine as claimed in claim 2, wherein said auxiliary-injection control means increases the auxiliary-injection amount so as to delay an ignition timing of the premixture of the fuel when the exhaust gas recirculation value is unduly lowered.

5. A combustion control apparatus for an engine as claimed in claim 1, further comprising, engine torque detecting means for detecting a value associated with the engine output torque, wherein said auxiliary-injection control means adjusts the auxiliary-injection amount according to at least the value detected by the engine torque detecting means.

6. A combustion control apparatus for an engine as claimed in claim 5, wherein, said auxiliary-injection control means increases or decreases the auxiliary-injection amount in a steady state of the engine, and controls the auxiliary-injection amount according to the change in the value detected by the engine torque detecting means as a result of the increase or decrease.

7. A combustion control apparatus for an engine as claimed in claim 6, wherein, said auxiliary-injection control means further increases the auxiliary-injection amount when the value detected by said engine torque detecting means changes towards a higher torque side as a result of the increase in the auxiliary-injection amount, and decreases the auxiliary-injection amount when the detected value changes towards a lower torque side as a result of the increase in the auxiliary-injection amount; and said auxiliary-injection control means decreases the auxiliary-injection amount when the value detected by said engine torque detecting means changes toward the higher torque side as a result of the decrease in the auxiliary-injection amount, and increases the auxiliary-injection amount when the detected value changes toward the lower torque side as a result of the decrease in the auxiliary-injection amount.

8. A combustion control apparatus for an engine, comprising:

a fuel injector extending into a combustion chamber of a cylinder of the engine, exhaust gas recirculation regulator means for adjusting the amount of an exhaust gas recirculated to the combustion chamber;

main-injection control means for controlling the injector to inject fuel at a timing during an intake stroke or a compression stroke to achieve a combustion in which a ratio of a premixed combustion is larger than that of a diffusion combustion when the engine is in a predetermined operational condition;

exhaust gas recirculation control means for controlling said exhaust gas recirculation regulator means so that an exhaust gas recirculation ratio is equal to 50% or more when the engine is in the predetermined operational condition; and auxiliary-injection control means for controlling the injector to start auxiliary-injection between 15 degree and 20 degrees crank angle before top-dead-center in a compression stroke, after the main injection is performed, wherein said auxiliary-injection control means further adjusts the auxiliary-injection amount according to an engine operational condition so that a transition from a cool flame reaction to a hot flame reaction caused by the compression stroke of the cylinder at increasing temperature by a premixture of the fuel occurring during the main-injection occurs within a predetermined period near the top-dead-center of the compression stroke of the cylinder.

9. A combustion control apparatus for an engine, comprising:

a fuel injector extending into a combustion chamber of a cylinder of the engine, an exhaust gas recirculation regulator which adjusts the amount of the exhaust gas recirculated to the combustion chamber;

an injection controller which controls the injector to perform a main injection so that the injector injects fuel at a timing during an intake stroke or a compression stroke to achieve a combustion in which a ratio of a premixed combustion is larger than that of a diffusion combustion when the engine is in a predetermined operational condition; and an exhaust gas recirculation controller which controls said exhaust gas recirculation regulator so that an exhaust gas recirculation ratio is equal to 50% or more when the engine is in the predetermined operational condition, wherein the injection controller controls the injector to perform an auxiliary-injection so that the injector starts the auxiliary-injection at a timing between 15 and 20 degrees crank angle before top-dead-center in the compression stroke, after the main injection is performed, wherein said auxiliary-injection control further adjusts the auxiliary-injection amount according to an engine operational condition so that a transition from a cool flame reaction to a hot flame reaction caused by the compression stroke of the cylinder at increasing temperature by a premixture of the fuel occurring during the main-injection occurs within a predetermined period near the top-dead-center of the compression stroke of the cylinder.

10. A combustion control apparatus for an engine, comprising:

a fuel injector extending into a combustion chamber of a cylinder of the engine, exhaust gas recirculation regulator means for adjusting the amount of the exhaust gas recirculated to the combustion chamber;

main-injection control means for controlling the injector to inject fuel at a timing during an intake stroke or a compression stroke to achieve a combustion in which a ratio of a premixed combustion is larger than that of a diffusion combustion when the engine is in a predetermined operational condition;

exhaust gas recirculation control means for controlling said exhaust gas recirculation regulator means, so that an exhaust gas recirculation value associated with the recirculation amount of the exhaust gas is a first predetermined value or more when the engine is in the predetermined operational condition; and auxiliary-injection control means for controlling the injector to perform auxiliary- injection at a predetermined timing at a late stage of the compression stroke, wherein said predetermined timing is within a timing between approximately 20 and approximately 10 degrees crank angle before top-dead-center in the compression stroke so as to delay a transition from a cool flame reaction to a hot flame reaction caused by the compression stroke of the cylinder at increasing temperature by a premixture of the fuel occurring during the main-injection, wherein said auxiliary-injection control means further adjusts the auxiliary-injection amount according to an engine operational condition so that the transition from the cool flame reaction to the hot flame reaction occurs within a predetermined period near the top-dead-center of the compression stroke of the cylinder.

11. A combustion control apparatus for an engine as claimed in claim 10, wherein, said auxiliary-injection control means adjusts the auxiliary-injection amount of fuel according to at least the exhaust gas recirculation value.

12. A combustion control apparatus for an engine as claimed in claim 11, further comprising, exhaust gas recirculation ratio estimating means for estimating an actual exhaust gas recirculation value of the engine, and wherein said auxiliary-injection control mean adjusts the auxiliary-injection amount according to at least the value estimated by the exhaust gas recirculation ratio estimating means.

13. A combustion control apparatus for an engine as claimed in claim 11, wherein said auxiliary-injection control means increases the auxiliary-injection amount so as to delay an ignition timing of the premixture of the fuel when the exhaust gas recirculation value is unduly lowered.

14. A combustion control apparatus for an engine as claimed in claim 10, further comprising, engine torque detecting means for detecting a value associated with the engine output torque, wherein said auxiliary-injection control means adjusts the auxiliary-injection amount according to at least the value detected by the engine torque detecting means.

15. A combustion control apparatus for an engine as claimed in claim 14, wherein, said auxiliary-injection control means increases or decreases the auxiliary-injection amount in a steady state of the engine, and controls the auxiliary-injection amount according to the change in the value detected by the engine torque detecting means as a result of the increase or decrease.

16. A combustion control apparatus for an engine as claimed in claim 15, wherein, said auxiliary-injection control means further increases the auxiliary-injection amount when the value detected by said engine torque detecting means changes towards a higher torque side as a result of the increase in the auxiliary-injection amount, and decreases the auxiliary-injection amount when the detected value changes towards a lower torque side as a result of the increase in the auxiliary-injection amount; and said auxiliary-injection control means decreases the auxiliary-injection amount when the value detected by said engine torque detecting means changes toward the higher torque side as a result of the decrease in the auxiliary-injection amount, and increases the auxiliary-injection amount when the detected value changes toward the lower torque side as a result of the decrease in the auxiliary-injection amount.

* * * * *